(12) United States Patent
Yokota

(10) Patent No.: US 6,834,252 B2
(45) Date of Patent: Dec. 21, 2004

(54) METHOD OF AND APPARATUS FOR ANALYZING POPULATION DISTRIBUTION, AND COMPUTER PRODUCT

(75) Inventor: Yoichi Yokota, Sapporo (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/012,477

(22) Filed: Dec. 12, 2001

(65) Prior Publication Data

US 2003/0014213 A1 Jan. 16, 2003

(30) Foreign Application Priority Data

Jul. 10, 2001 (JP) ........................................ 2001-209914

(51) Int. Cl.⁷ ..................... G01C 17/00; G01C 19/00; G01C 9/00; G06F 15/00
(52) U.S. Cl. ..................... 702/150; 702/179; 702/14; 702/7; 705/7
(58) Field of Search .............................. 702/150, 179, 702/14, 7; 705/7

(56) References Cited

U.S. PATENT DOCUMENTS

| | | | |
|---|---|---|---|
| 5,724,241 A | * | 3/1998 | Wood et al. ................... 702/14 |
| 2002/0026289 A1 | * | 2/2002 | Kuzunuki et al. ........... 702/150 |
| 2002/0082805 A1 | * | 6/2002 | Jacquez ...................... 702/179 |
| 2003/0046121 A1 | * | 3/2003 | Menninger et al. ............ 705/7 |

* cited by examiner

Primary Examiner—John Barlow
Assistant Examiner—Aditya S Bhat
(74) Attorney, Agent, or Firm—Staas & Halsey LLP

(57) ABSTRACT

The population distribution analyzing apparatus is provided with the area setting unit which sets an area in which population distribution of a plurality of users respectively carrying a portable terminal therewith is to be analyzed; the positional information acquiring unit which acquires respective positional information of each portable terminal, and the analyzing unit which analyzes the population distribution of the users in the set area on the basis of the acquired positional information.

13 Claims, 27 Drawing Sheets

FIG.2

| USER ID | NAME | POSTAL CODE NUMBER | ADDRESS | DATE OF BIRTH | SEX | KIND OF TERMINAL | TELEPHONE NUMBER OF CONTACT ADDRESS | BANK CODE | ACCOUNT NUMBER | CREDIT NUMBER | CONTRACT PLAN |
|---|---|---|---|---|---|---|---|---|---|---|---|
| 09022223333 | FUJITSU TARO | 069-8550 | EBETSU-CITY, HOKKAIDO | 1976/01/01 | MALE | F503i | 011-1234-5678 | 9999999 | 9999999 | 9999999999999999 | FAMILY DISCOUNT |
| .. | .. | .. | .. | .. | .. | .. | .. | .. | .. | .. | .. |
| .. | .. | .. | .. | .. | .. | .. | .. | .. | .. | .. | .. |
| .. | .. | .. | .. | .. | .. | .. | .. | .. | .. | .. | .. |

| USER ID | NAME | MARRIED OF UNWED | BLOOD TYPE | MAIL ADDRESS | STATE OF LIFE | AVOCAT-ION 1 | AVOCAT-ION 2 | AVOCAT-ION 3 | INTEREST FIELD | | | |
|---|---|---|---|---|---|---|---|---|---|---|---|---|
| | | | | | | | | | | | | |
| 09022223333 | FUJITSU TARO | MARRIED | AB (+) | fujitaro@~ | HAIRDRESSER | MUSIC LISTENING | MOVIE WATCHING | CAMP | CAR | FASHION | CHINESE NOODLE | DANCING |
| .. | .. | .. | .. | .. | .. | .. | .. | .. | .. | .. | .. | .. |
| .. | .. | .. | .. | .. | .. | .. | .. | .. | .. | .. | .. | .. |
| .. | .. | .. | .. | .. | .. | .. | .. | .. | .. | .. | .. | .. |

| USER ID | BASE STATION ID | x COORDINATE | y COORDINATE | z COORDINATE |
|---|---|---|---|---|
| 09022223333 | 001 | 999 | 999 | 999 |
| .. | .. | .. | .. | .. |
| .. | .. | .. | .. | .. |
| .. | .. | .. | .. | .. |

| CATEGORY | LOWER LIMIT OF AGE | UPPER LIMIT OF AGE | SEX | MARRIAGE | STATE OF LIFE | | | AVOCATION | | | | FIELD OF INTEREST | | |
|---|---|---|---|---|---|---|---|---|---|---|---|---|---|---|
| | | | | | BUSINESS PERSON | SELF-OWNED BUSINESS | STUDENT | CAMERA | TRAVEL | PHOTO-GRAPH | MACHINE | SCIENCE | NATURE |
| CAMERA | 12 | 70 | MALE | | | | | | | | | | |
| CAR | 17 | 70 | MALE | | | | | CAR | DRIVE | MODEL | F1 | WRC | PARIS-DAKAR RALLY |
| | 6 | 30 | | UNWED | BUSINESS PERSON | STUDENT | SE | COMIC | VIDEO | | ANIMATION | ROBOT | IDLE |
| ANIMATION | .. | .. | | | | | | | | | | | |
| | .. | .. | | | | | | | | | | | |

| USER ID | x COORDINATE | y COORDINATE | z COORDINATE | ZONE RADIUS |
|---|---|---|---|---|
| 000001 | 999 | 999 | 999 | 2km |
| .. | .. | .. | .. | .. |
| ... | ... | ... | ... | ... |
| ... | ... | ... | ... | ... |

| MAP MESH ID | BOTTOM LEFT x COORDINATE | BOTTOM LEFT y COORDINATE | UPPER RIGHT x COORDINATE | UPPER RIGHT y COORDINATE | SCREEN DISPLAY IMAGE DATA |
|---|---|---|---|---|---|
| 000001 | 0 | 0 | 100 | 100 | aaa.gif |
| 000002 | 100 | 0 | 200 | 100 | bbb.gif |
| .. | .. | .. | .. | .. | .. |
| .. | .. | .. | .. | .. | .. |
| .. | .. | .. | .. | .. | .. |

| ADDRESS | LANDMARK | x COORDINATE | y COORDINATE | z COORDINATE |
|---|---|---|---|---|
| ATSUBETSU-KU, SAPPORO-CITY, HOKKAIDO | | 110 | 120 | 30 |
| .. | .. | .. | .. | .. |
| | SAPPORO ELECTRONICS CENTER | 120 | 150 | 20 |
| | .. | .. | .. | .. |
| | .. | .. | .. | .. |

| MAP MESH ID | NUMBER OF USERS | USER ID | x COORDINATE | y COORDINATE | z COORDINATE |
|---|---|---|---|---|---|
| 000001 | 3 | 09022223333 | 999 | 876 | 754 |
| | | 09033334444 | 865 | 866 | 777 |
| | | 09055556666 | 995 | 855 | 766 |
| 000002 | 10 | 09077778888 | 756 | 600 | 745 |
| .. | .. | .. | .. | .. | .. |

| MAP MESH ID | NUMBER OF USERS | USER ID | x COORDINATE | y COORDINATE | z COORDINATE |
|---|---|---|---|---|---|
| 000001 | 2 | 09022223333 | 999 | 876 | 754 |
|  |  | 09033334444 | 865 | 866 | 777 |
| 000002 | 8 | 09077778888 | 756 | 600 | 745 |
| .. | .. | .. | .. | .. | .. |

INPUT TARGET GROUP TEMPLATE

1101

☐ CHILD

☑ YOUNG PEOPLE

☑ MIDDLE AGE

☑ LATE MIDDLE AGE

☐ OLD AGE

CATEGORY  1102

| WHITE CONSUMER ELECTRONICS ▼ |
| --- |
| WHITE CONSUMER ELECTRONICS |
| AUDIO AND VISUAL EQUIPMENT |
| FOODS |
| DRINKS |
| CAMERA |
| MOVIE |
| MUSIC |

1103

( RETURN )

FIG.24

INPUT TARGET GROUP DETAIL

| AGE | 13 YEARS OLD ~ 22 YEARS OLD |
| SEX | ○ MALE  ○ FEMALE  ○ REGARDLESS |
| MARRIAGE | ○ MARRIED  ○ SINGLE  ○ REGARDLESS |
| ADDRESS | HOKKAIDO ▼   CITY |
| AVOCATION | MUSIC ▼   MOVIE ▼   ▼ |
| STATE OF LIFE | STUDENT ▼ |

FIELD OF INTEREST
DANCE ▼

INPUT OTHER SEARCH TERM
MUSICAL

RETURN

FIG.25

CONFIRM SET

FOLLOWING CONTENTS ARE SET

- DETAIL SET
- TEMPLATE

AGE : 13 YEARS OLD ~ 22 YEARS OLD   TEMPLATE IS NOT DESIGNATED

SEX : REGARDLESS

MARRIAGE : REGARDLESS

ADDRESS : HOKKAIDO

AVOCATION : MUSIC

STATE OF LIFE : STUDENT

FIELD OF INTEREST : DANCE

OTHER SEARCH TERM : HARD ROCK

[ EXECUTE ]

[ CANCEL ]

- TARGET AREA

ASHIBETSU-KU, SAPPORO-CITY, HOKKAIDO ( RETURN )

METHOD OF AND APPARATUS FOR ANALYZING POPULATION DISTRIBUTION, AND COMPUTER PRODUCT

FIELD OF THE INVENTION

The present invention relates to a technology for analyzing population distribution which can accurately comprehend a population distribution and an attribute in real time. This technology can be used, for example, for a promotion and advertising campaign on the basis of a population distribution.

BACKGROUND OF THE INVENTION

Even at the present time when an electronic media advertising such as an internet advertising, a television advertising or the like is developed, there is used a mobile promotion and advertising media such as "a truck mounting a large-sized display for promotion on a rear bed", "a promotion car", "an airship with an advertising" or the like, as a promotion and advertising medium relating to a commercial, an election or the like (hereinafter, refer to a mobile promotion and advertising medium).

Further, an advertising provider (an advertising agency or the like) estimates a spot (an area, an event place or the like) where a density of population for targets of the promotion and advertising seems to be high, a moving path, a number of the targets and attributes (sex, age or the like) of the targets on the basis of a population density calculated by statistics, a turnout expected in a sightseeing area, with or without the event, a past record of the advertising, an experience, an information of a field and a gut feeling. Further, the advertising provider moves the respective spots along the estimated moving path and develops the promotion and advertising campaign with respect to the targets in the respective spots by using the mobile promotion and advertising medium.

In this case, as mentioned above, in conventional, a promotion strategy using the mobile promotion and advertising medium is planed on the basis of the information such as the population density by the statistics or the like. However, in the case that there is a difference between the population density on the statistics and an actual population density due to a delay of renewal, a climate change and a change of rating of the event, an advertising effect can not be frequently increased to a level expected at the beginning.

This is because it is inherently hard to estimate the distribution of the targets, the number of targets and the attributes due to a fact that may indefinite elements exist at a time of estimating the distribution of the targets for the promotion and advertising.

For example, in local and national elections, in order to increase a promotion and advertising effect, an election campaign (a promotion and advertising campaign) by using an election car is developed by setting an area having a high density of population of legal ages having an election franchise to the target, however, if a rate of person under age is high in the area in contradiction to the original estimation, the promotion and advertising effect is violently reduced as a matter of course.

As mentioned above, in conventional, there is a problem that it is very hard to accurately comprehend the population distribution and the attributes in real time.

SUMMARY OF THE INVENTION

It is an object of the present invention to provide a method of and an apparatus for analyzing population distribution which can accurately comprehend a population distribution and an attribute in real time. It is also an object of the present invention to provide computer program for realizing the method according to the present invention on a computer.

According to one aspect of the present invention, an area in which population distribution of a plurality of users respectively carrying a portable terminal therewith is to be analyzed is set, positional information of each portable terminal is acquired, and the population distribution of the users in the set area is analyzed on the basis of the acquired positional information.

According to another aspect of the present invention, an area in which population distribution of a plurality of subjects is to be analyzed is set, positional information of each subject is acquired in accordance with a mobile communication system, and the population distribution of the subjects in the set area is analyzed on the basis of the acquired positional information.

In accordance with the present invention, since the structure is made such as to set the area of a subject of the population distribution analysis and acquire the positional information of the users of the portable terminals in this area and thereafter analyze the population distribution of the users in the area based on the positional information, it is possible to accurately comprehend the population distribution and the attribute in real time.

Other objects and features of this invention will become apparent from the following description with reference to the accompanying drawings.

BRIEF DESCRIPTION OF THE DRAWINGS

FIG. 2 is a view showing an example of a contract information data base 600 shown in FIG. 1, FIG. 3 is a view showing an example of a user profile information data base 610, FIG. 4 is a view showing an example of a portable terminal positional information table 620 shown in FIG. 1, FIG. 5 is a view showing an example of a target group template information table 630 shown in FIG. 1, FIG. 6 is a view showing an example of a base station position information table 640 shown in FIG. 1, FIG. 7 is a view showing an example of a map information data base 650 shown in FIG. 1, FIG. 8 is a view showing an example of an address and landmark positional information data base 660 shown in FIG. 1, FIG. 9 is a view showing an example of a distribution information aggregation table 670 shown in FIG. 1, FIG. 10 is a view showing an example of an analysis result information table 680 shown in FIG. 1, FIG. 23 is a view showing an example of a target group template inputting screen 1100 in accordance with the same embodiment, FIG. 24 is a view showing an example of a target group details inputting screen 1200 in accordance with the same embodiment, FIG. 25 is a view showing an example of a settings confirming screen 1300 in accordance with the same embodiment.

DETAILED DESCRIPTION

Embodiment(s) of the method of and the apparatus for analyzing population distribution and the computer program according to the present invention will be explained in detail with reference to the accompanying drawings.

Figure 1:
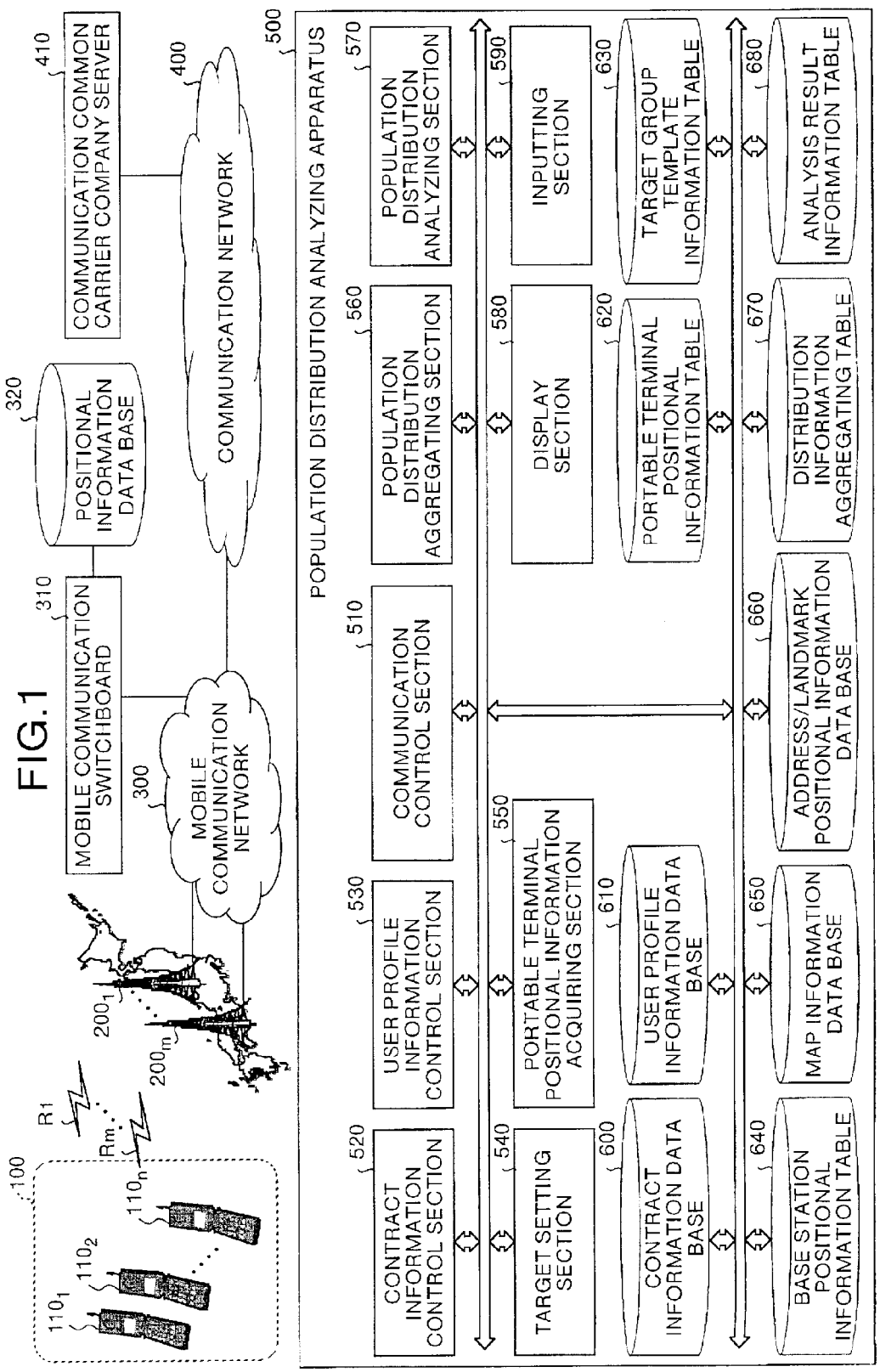
FIG. 1 is a block diagram showing a structure of an embodiment in accordance with the present invention.

FIG. 1 is a block diagram showing a structure of an embodiment in accordance with the present invention. In FIG. 1, there is illustrated a population distribution analyzing apparatus 500 for analyzing a population distribution by using a portable terminal as an example of a distribution analysis. In FIG. 1, a portable terminal group 100 is constituted by n number of portable terminals $110_1$ to $110_n$ scattered in various locations in Japan.

These portable terminals $110_1$ to $110_n$ are constituted by a cellular phone, a personal handy phone system (PHS), a personal digital assistance (PDA) or the like, and are brought with n number of users, respectively. These n number of users are distributed in various locations in Japan. Accordingly, the population distribution of the users changes hour by hour on the basis of movement of the users.

Further, the portable terminals $110_1$ to $110_n$ are structured such as to be capable of being communicated with wireless base stations $200_1$ to $200_m$ scattered on the basis of a zone constitution via wireless links $R_1$ to $R_m$. These wireless base stations $200_1$ to $200_m$ are respectively placed centers of zones having a radius between some hundreds m and some km. In the following description, the radius of the zone is called as a zone radius. The zone radius shows a range which the wireless base station covers. In a mobile communication system, a plurality of zones are set so as to cover a whole of the area.

Accordingly, in view of a national level of Japan, the portable terminals $110_1$ to $110_n$ exist within any one zone among all the zones. Further, each of the portable terminals $110_1$ to $110_n$ is provided with a position registering function for registering a portable terminal position (a position of the zone where the portable terminal exists) in a position information data base 320 mentioned below, and a communication function with respect to a voice, a data or the like.

The wireless base stations $200_1$ to $200_m$ are connected to a mobile communication switchboard 310 via a mobile communication network 300. The mobile communication switchboard 310 is provided with a function of switching a call in accordance with a mobile communication by using the portable terminals $110_1$ to $110_n$. The positional information data base 320 corresponds to a data base for storing a base station positional information with respect to each of the portable terminal positions and the wireless base stations $200_1$ to $200_m$ relating to the respective portable terminals $110_1$ to $110_n$. The mobile communication system mentioned above is constituted by the portable terminal group 100, the wireless base stations $200_1$ to $200_m$, the mobile communication network 300, the mobile communication switchboard 310 and the positional information data base 320.

Further, the mobile communication switchboard 310 is accessed to a population distribution analyzing apparatus 500 via the mobile communication network 300 and a communication network 400. A communication common carrier company server 410 is placed in a side of a communication common carrier company, and corresponds to a server for providing a contract information relating to a utilization contract concluded between the users of the portable terminals $110_1$ to $110_n$ and the communication common carrier company and a user profile information to the population distribution analyzing apparatus 500.

In this case, as the contract information, there can be listed up user ID (identification date), name, postal code number, address, date of birth and the like. Further, as the user profile information, there can be listed up blood type of the user, state of life, avocation, interest field and the like. The population distribution analyzing apparatus 500 corresponds to an apparatus for analyzing the population distribution of the users of the portable terminals $110_1$ to $110_n$ by utilizing the mobile communication system.

In the population distribution analyzing apparatus 500, a communication control section 510 controls a communication with respect to the mobile communication switchboard 310 in accordance with a predetermined communication protocol. A contract information control section 520 is provided with a function of acquiring and controlling the contract information mentioned above from the communication common carrier company server 410 via the communication network 400. A user profile information control section 530 is provided with a function of acquiring and controlling the user profile information mentioned above from the communication common carrier company server 410 via the communication network 400.

A target setting section 540 is provided with a function of setting a target area corresponding to an area to be analyzed the population distribution relating to a target of the population distribution analysis, that is, the users of the portable terminals, and a target group (by sex, age or the like). A portable terminal position information acquiring section 550 is provided with a function of acquiring the portable terminal positional information from the positional information data base 320 via the communication network 400 and the mobile communication network 300.

A population distribution aggregating section 560 is provided with a function of aggregating the population distribution corresponding to the target area and the target group set by the target setting section 540 on the basis of the portable terminal positional information. A population distribution analyzing section 570 is provided with a function of analyzing the population distribution aggregated by the population distribution aggregating section 560. A display section 580 is provided with a function of displaying an analysis result of the population distribution analyzing section 570 and various screens. An inputting section 590 corresponds to a keyboard, a mouse or the like.

A contract information data base 600 corresponds to a data base for storing the contract information mentioned above. In particular, as shown in FIG. 2, the contract information data base 600 is provided with fields of "user ID", "name", "postal code number", "address", "date of birth", "sex", "kind of terminal", "telephone number of contact address", "bank code", "account number", "credit number" and "contract plan".

The "user ID" correspond to an identification data for identifying the user (the portable terminal), for example, is constituted by a cellular phone number. Accordingly, the user ID is attached to each of the portable terminals $110_1$ to $110_n$. The "name" corresponds to an information relating to the name of the user. The "postal code number" corresponds to an information relating to a postal code number of the user. The "address" corresponds to an information relating to an address of the user. The "date of birth" corresponds to an information relating to a date of birth of the user. The "sex" corresponds to an information relating to a sex of the user.

The "kind of terminal" corresponds to an information relating to a kind of the portable terminal of a subject of contract. The "telephone number of contact address" corresponds to an information relating to a telephone number at a time of contacting with the user from the communication common carrier company. The "bank code" corresponds to a code for identifying a bank at a time of checking off a user cost of the portable terminal.

The "account number" corresponds to an information relating to a number of a check-off account for the user cost. The "credit number" corresponds to an information relating to a number of a credit card at a time of paying the use cost by a credit card. The "contract plan" corresponds to an information relating to various contract plans such as a family price cutting or the like.

Returning to FIG. 1, a user profile information data base 610 corresponds to a data base for storing the user profile information mentioned above. In particular, as shown in FIG. 3, the user profile information data base 610 is provided with fields of "user ID", "name", "married or unwed", "blood type", "mail address", "state of life", "avocation 1", "avocation 2", "avocation 3" and "interest field".

The "user ID" corresponds to an identification data for identifying the user, and corresponds to the "user ID" of the contract information database 600 (refer to FIG. 2). The "name" corresponds to an information relating to the name of the user, and corresponds to the "name" of the contract information data base 600 (refer to FIG. 2). The "married or unwed" corresponds to an information expressing whether the user is married or unwed.

The "blood type" corresponds to an information relating to a blood type of the user. The "mail address" corresponds to an information relating to a mail address of the user. The "state of life" corresponds to an information relating to a state of life of the user. The "avocation 1" corresponds to an information relating to a first avocation of the user. The "avocation 2" corresponds to an information relating to a second avocation of the user. The "avocation 3" corresponds to an information relating to a third avocation of the user. The "interest field" corresponds to an information relating to a field in which the user is interested.

Returning to FIG. 1, a portable terminal positional information table 620 corresponds to a table for storing the portable terminal positional information mentioned above. In particular, as shown in FIG. 4, the portable terminal positional information table 620 is provided with fields of "user ID", "base station ID", "x coordinate", "y coordinate" and "z coordinate".

The "user ID" corresponds to an identification data for identifying the user (the portable terminal), and corresponds to the "user ID" of the contract information data base 600 (refer to FIG. 2). The "base station ID" corresponds to an identification data for identifying the wireless base station covering the zone in which the portable terminal exists. Accordingly, the base station ID is applied to each of the wireless base stations $200_1$ to $200_m$ (refer to FIG. 1).

The "x coordinate", "y coordinate" and "z coordinate" correspond to information relating to a three-dimensional coordinate indicating each of positions of the portable terminals $110_1$ to $110_n$ (n number of users) on the map. For example, the "x coordinate" corresponds to a latitude, the "y coordinate" corresponds to a longitude and the "z coordinate" corresponds to a height.

Returning to FIG. 1, a target group template information table 630 corresponds to a data base for storing a target group template information for setting a target group corresponding to a search key in the population distribution analysis to a template. In particular, as shown in FIG. 5, the target group template information table 630 is provided with fields of "category", "lower limit of age", "upper limit of age", "sex", "marriage", "state of life" "avocation" and "field of interest".

The "category" corresponds to an information relating to a category of the target group template. The "lower limit of age" and "upper limit of age" correspond to information relating a range of age of the target group. The "sex" corresponds to an information relating to a sex of the target group. The "marriage" corresponds to an information showing a marriage condition (married/unwed) of the target group. The "state of life" corresponds to an information relating to a state of life of the target group. The "avocation" corresponds to an information relating to an avocation of the target group. The "field of interest" corresponds to an information relating to a field in which the target group is interested.

Returning to FIG. 1, a base station positional information table 640 corresponds to a table for storing the base station positional information mentioned above. In particular, as shown in FIG. 6, the base station positional information table 640 is provided with fields of "base station ID", "x coordinate", "y coordinate", "z coordinate", and "zone radius".

The "base station ID" corresponds to an identification data for identifying each of the wireless base stations $200_1$ to $200_m$. The "x coordinate", "y coordinate" and "z coordinate" correspond to information relating to a three-dimensional coordinate indicating each of positions of the wireless base stations $200_1$ to $200_m$ on the map. For example, the "x coordinate" corresponds to a latitude, the "y coordinate" corresponds to a longitude and the "z coordinate" corresponds to a height. A "zone radius" corresponds to an information relating to a radius (covering area) of zone of each of the wireless base stations $200_1$ to $200_m$.

Returning to FIG. 1, a map information data base 650 corresponds to a data base for storing the map information. In particular, as shown in FIG. 7, the map information data base 650 is provided with fields of "map mesh ID", "bottom left x coordinate", "bottom left y coordinate", "upper right x coordinate", "upper right y coordinate" and "screen display image data".

The "map mesh ID" corresponds to an identification data for identifying respective map meshes on a map (refer to FIG. 26, map 1401) sectioned in mesh in x and y directions for expressing the population distribution. The "bottom left x coordinate" corresponds to an information relating to an x cooperate in a bottom left corner of the map mesh. The "bottom left y coordinate" corresponds to an information relating to a y coordinate in the bottom left corner of the map mesh.

The "upper right x coordinate" corresponds to an information relating to an x coordinate in an upper right corner of the map mesh. The "upper right y coordinate" corresponds to an information relating to a y coordinate in the upper right corner of the map mesh. The "screen display image data" corresponds to an information relating to an image date (a file name) at a time of displaying the map mesh portion on a screen.

Returning to FIG. 1, an address/landmark positional information data base 660 corresponds to a data base for storing an address/landmark positional information corresponding to an address or a landmark at a time of setting a target area on the map by an address or a landmark (a building or the like forming an eye mark). In particular, as shown in FIG. 8, it is provided with fields of "address", "landmark", "x coordinate", "y coordinate" and "z coordinate".

The "address" corresponds to an information relating an address as a subject to be set of the target area. The "landmark" corresponds to an information relating to a landmark as a subject to be set of the target area. The "x coordinate", "y coordinate" and "z coordinate" correspond to information relating to a three-dimensional coordinate indicating a position of the address or the landmark on the map. For example, the "x coordinate" corresponds to a latitude, the "y coordinate" corresponds to a longitude and the "z coordinate" corresponds to a height.

Returning to FIG. 1, a distribution information aggregating table 670 corresponds to a table for storing a distribution information expressing a population distribution of the portable terminal on the map. In particular, as shown in FIG. 9, it is provided with fields of "map mesh ID", "number of users", "user ID", "x coordinate", "y coordinate" and "z coordinate".

The "map mesh ID" corresponds to an identification data for identifying respective map meshes in a map mesh corresponding to a set target area on a map (refer to FIG. 26, map 1401) sectioned in mesh in x and y directions for expressing the population distribution, and corresponds to the "map mesh ID" shown in FIG. 7. The "number of users" corresponds to an information relating to a number of users of the portable terminals, that is, a population existing on the map mesh.

The "user ID" corresponds to an identification data for identifying the users existing on the map mesh, and corresponds to the "user ID" shown in FIG. 2. The "x coordinate", "y coordinate" and "z coordinate" is obtained by applying a weighted average method to a plurality of (or single) positions of a plurality of (or single) portable terminals (users) existing on the map mesh, and corresponds to an information relating to a representative position of the map mesh.

Returning to FIG. 1, an analysis result information table 680 corresponds to a table for storing an analysis result information expressing a population distribution obtained by narrowing down and analyzing a population distribution corresponding to the target area on the basis of the target group corresponding to a searching key. In particular, as shown in FIG. 10, the analysis result information table 680 is provided with fields of "map mesh ID", "number of users", "user ID", "x coordinate", "y coordinate" and "z coordinate".

The "map mesh ID" corresponds to an identification data for identifying respective map meshes in a map mesh corresponding to a set target area on a map (refer to FIG. 26, map 1401) sectioned in mesh in x and y directions for expressing the population distribution, and corresponds to the "map mesh ID" shown in FIGS. 7 and 9.

The "number of users" corresponds to an information relating to a number of users corresponding to the set target group (a population of the target group on a certain map mesh), among the "number of users" shown in FIG. 9. For example, in the case that ten persons exist on a certain map mesh due to setting of the target area, and five persons among ten persons are men, the "number of users" shown in FIG. 10 becomes 5 by setting "man" as the target group.

The "user ID" corresponds to an identification data for identifying the users of a certain target group existing on the map mesh. The "x coordinate", "y coordinate" and "z coordinate" are obtained by applying a weighted average method to a plurality of (or single) positions of a plurality of (or single) portable terminals (users) existing on the map mesh, and corresponds to the "x coordinate", "y coordinate" and "z coordinate" shown in FIG. 9.

Next, a description will be given of an operation of an embodiment with reference to flow charts shown in FIGS. 11 to 18 and respective screens shown in FIGS. 19 to 26. The contract information control section 520 shown in FIG. 1 stores the contract information in the contract information data base 600 (refer to FIG. 2) from the communication common carrier company server 410 via the communication network 400 at every predetermined time. Accordingly, the contract information data base 600 is renewed by an up-to-date contract information.

Further, the user profile information control section 530 stores the user profile information in the user profile information data base 610 (refer to FIG. 3) from the communication common carrier company server 410 via the communication network 400 at every predetermined time. Accordingly, the user profile information data base 610 is renewed by an up-to-date contract information.

Figure 11:
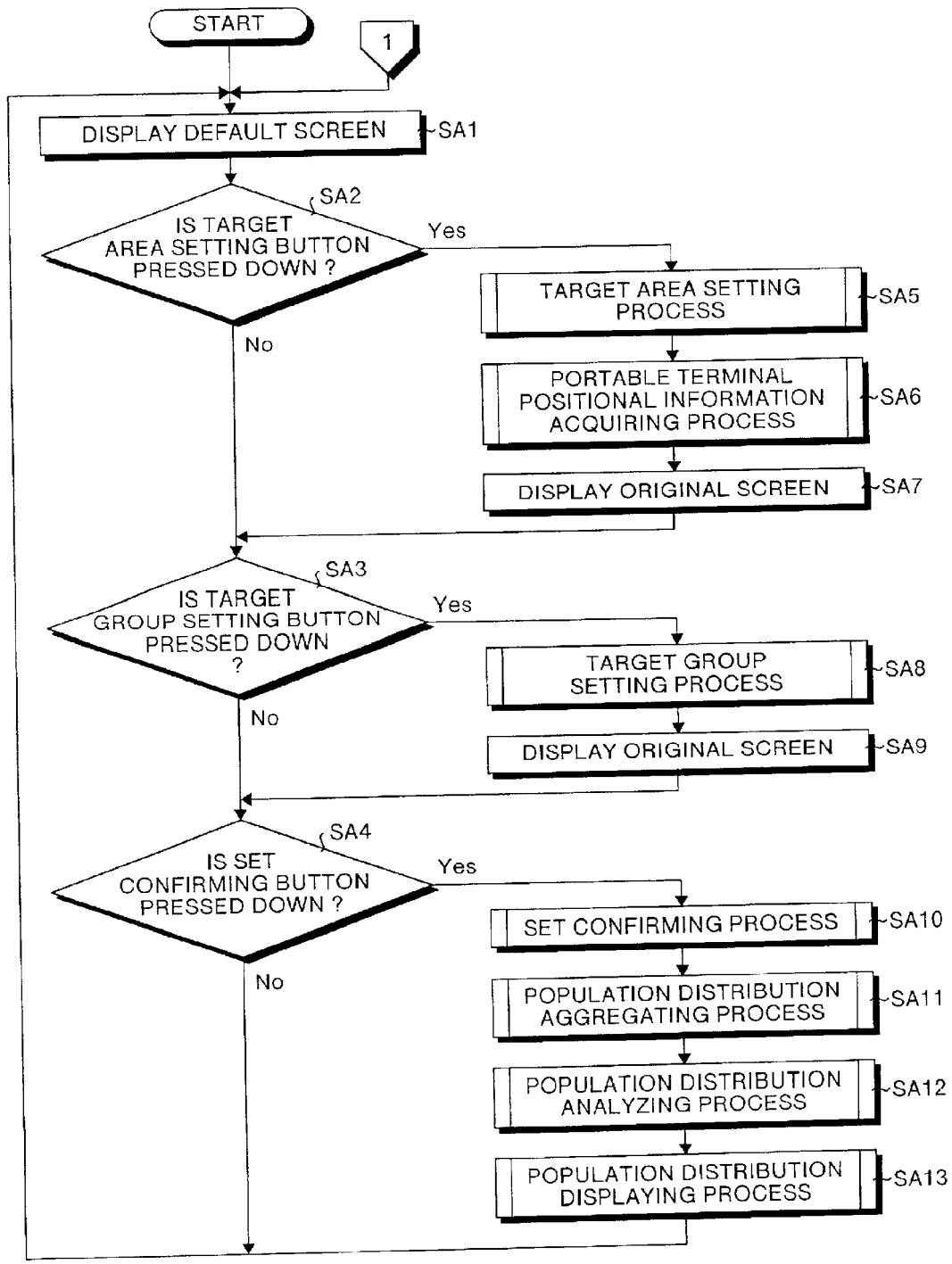
FIG. 11 is a flow chart describing an operation of the same embodiment.
Figure 19:
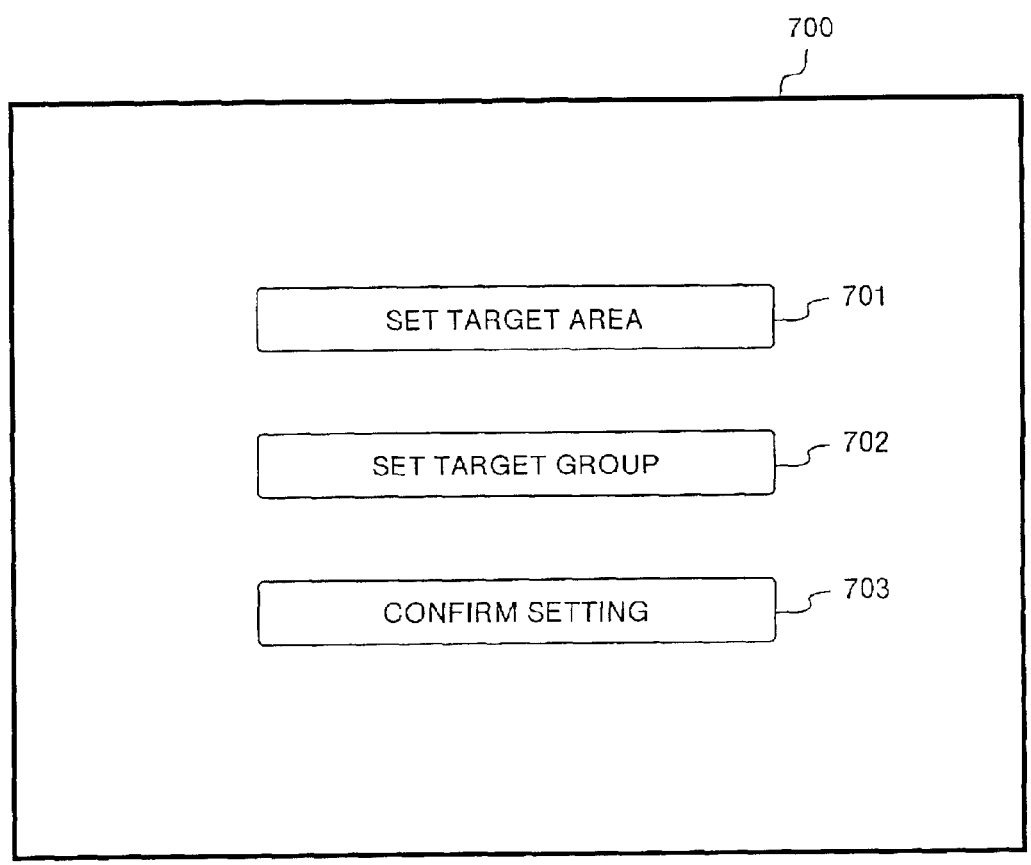
FIG. 19 is a view showing an example of an initial screen 700 in accordance with the same embodiment.

In this case, when an operation command is output by an operator, at step SA1 shown in FIG. 11, a default screen 700 shown in FIG. 19 is displayed on the display section 580. The default screen 700 corresponds to a screen for selecting any one of setting the target area, setting the target group and confirming the setting which are required for the population distribution analysis. In the default screen 700, a target area setting button 701, a target group setting button 702 and a settings confirming button 703 are displayed.

The target area setting button 701 corresponds to a button for setting the target area corresponding to the subject area of the population distribution analysis on a Japan map. The target group setting bottom 702 corresponds to a button for setting the target group serving as the narrow-down searching key with respect to the population distribution in the target area. The settings confirming button 703 corresponds to a button for confirming the target area and the target group to be set so as to execute the population distribution analysis.

Returning to FIG. 11, at step SA2, the target setting section 540 judges whether or not the target area setting button 701 (refer to FIG. 19) is pressed down, and in this case, sets a judging result to "No". At step SA3, the target setting section 540 judged whether or not the target group setting button 702 (refer to FIG. 19) is pressed down, and in this case, sets a judging result to "No".

At step SA4, the target setting section 540 judges whether or not the settings confirming button 703 (refer to FIG. 19) is pressed down, and in this case, sets a judging result to "No". Thereafter, the steps SA1 to SA4 are repeated until any one of the judging results at steps SA2 to SA4 becomes "Yes".

Further, the operator presses down the target area setting button 701 by using the inputting section 590 so as to set the target area. Accordingly, the target setting section 540 sets the judging result at step SA2 to "Yes". At step SA5, the target setting section 540 executes a target area setting process.

Figure 12:
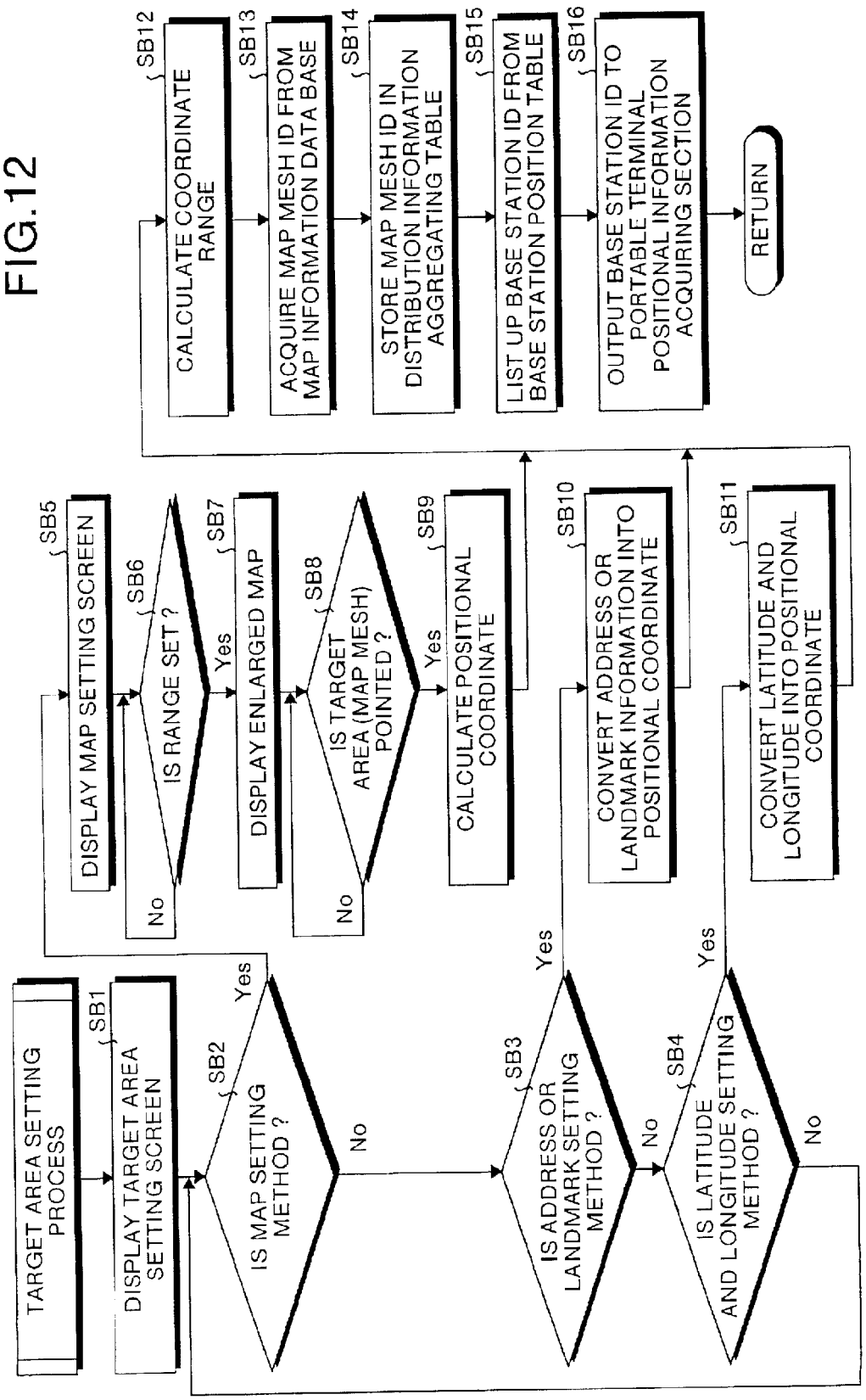
FIG. 12 is a flow chart describing a target area setting process shown in FIG. 11.
Figure 20:
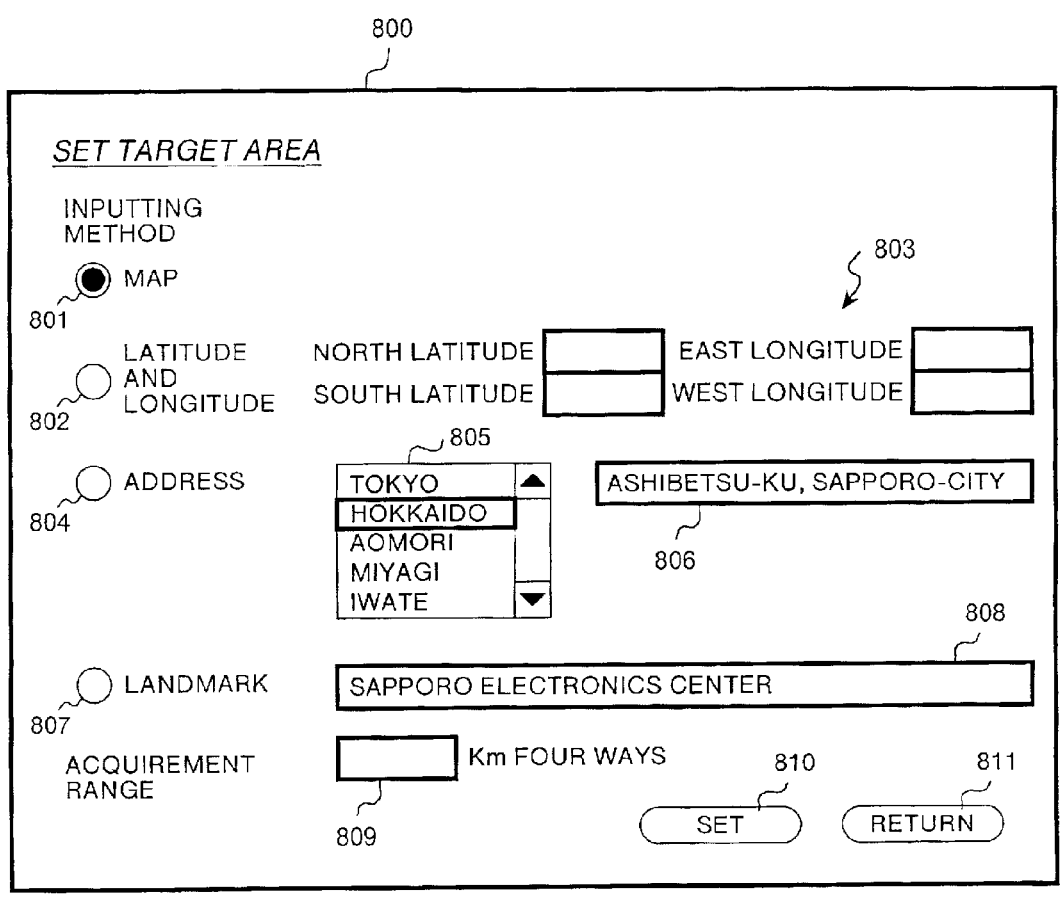
FIG. 20 is a view showing an example of a target area setting screen 800 in accordance with the same embodiment.

In particular, at step SB1 shown in FIG. 12, the target setting section 540 displays a target area setting screen 800 shown in FIG. 20 on the display section 580. The target area setting screen 800 corresponds to a screen for setting the target area on the basis of any one of a map setting method, a latitude and longitude setting method, an address setting method and a landmark setting method which constitute a method of setting the target area.

The map setting method corresponds to a method of setting the target area on the map on the basis of a map setting screen 900 (refer to FIG. 21) mentioned below. The latitude and longitude setting method corresponds to a method of setting the target area on the basis of the latitude and longitude. The address setting method corresponds to a method of setting the target area on the basis of the address. The landmark setting method corresponds to a method of setting the target area on the basis of the landmark (building or the like forming an eye mark).

In the target area setting screen 800, a map setting radio button 801 corresponds to a button for selecting a map setting method. A latitude and longitude radio button 802 corresponds to a button for selecting a latitude and longitude setting method. A latitude and longitude inputting space 803 corresponds to a space for inputting a latitude (north latitude or south latitude) and a longitude (east longitude or west longitude) on the basis of the latitude and longitude setting method.

An address radio button 804 corresponds to a button for selecting an address setting method. A prefectural and city governments selecting space 805 corresponds to a space for selecting a prefectural and city governments constituting a large category of the address. A detailed address inputting space 806 corresponds to a space for inputting a detailed address (city, town, village or arrondissement) following to the prefecture and city governments. A landmark setting button 807 corresponds to a button for selecting a landmark setting method.

A landmark information inputting space 808 corresponds to a space for inputting an information of the landmark. An acquirement range inputting space 809 corresponds to a space for inputting a range of an area where the population distribution analysis result should be acquired, that is, a range of the target area. A setting button 810 corresponds to a button for instructing setting of the target area. A return button 811 corresponds to a button for transiting the screen to the preceding screen.

Returning to FIG. 12, at step SB2, the target setting section 540 judges whether or not the map setting method is selected among four kinds of target area setting methods mentioned above. In particular, the target setting section 540 judges whether or not the setting button 810 is pressed down after the map setting radio button 801 shown in FIG. 20 is checked and the acquirement range is input to the acquirement range inputting space 809. In this case, the target setting section 540 sets a judgment result at step SB2 to "No".

At step SB3, the target setting section 540 judges whether or not the address or landmark setting method is selected among four kinds of target area setting method mentioned above. In particular, the target setting section 540 judges whether or not the setting button 810 is pressed down after the address radio button 804 shown in FIG. 20 is checked, the prefectural and city governments is selected in the prefectural and city governments selecting space 805, the detailed address is input to the detailed address inputting space 806 and the acquirement range is input to the acquirement range inputting space 809.

Otherwise, the target setting section 540 judges whether or not the setting button 810 is pressed down after the landmark setting button 807 is checked, the landmark information is input to the landmark information inputting space 808 and the acquirement range is input to the acquirement range inputting space 809. In this case, the target setting section 540 sets a judgment result at step SB3 to "No".

At step SB4, the target setting section 540 judges whether or not the latitude and longitude setting method is selected among four kinds of target area setting methods mentioned above. In particular, the target setting section 540 judges whether or not the setting button 810 is pressed down after the latitude and longitude radio button 802 shown in FIG. 20 is checked, the latitude and longitude are input to the latitude and longitude inputting space 803 and the acquirement range is input to the acquirement range inputting space 809.

In this case, the target setting section 540 sets a judgment result at step SB4 to "No", and repeats the judgments at steps SB2 to SB4 until any one of the judgment results at steps SB2 to SB4 becomes "Yes".

In this case, when the setting button 810 is pressed down after the map setting radio button 801 shown in FIG. 20 is checked and the acquirement range is input to the acquirement range inputting space 809, the target setting section 540 sets the judgment result at step SB2 to "Yes". At step SB5, the target setting section 540 displays the map setting screen 900 shown in FIG. 21 on the display section 580.

The map setting screen 900 corresponds to a screen for setting the target area on the basis of the map setting method. In this map setting screen 900, a Japan map 901 corresponds to a map showing all the target area of the subject of the population distribution analysis. A range specification box 902 corresponds to a box for specifying a certain range (south portion in Hokkaido, in the drawing) on the Japan map 901.

An enlarged map 903 corresponds to a map obtained by enlarging a map within the range specification box 902, and is sectioned in an x direction and a y direction so as to form a mesh shape. One of the sections corresponds to the map mesh mentioned above. A return button 904 corresponds to a button for transiting the screen to the preceding screen.

Returning to FIG. 12, at step SB6, the target setting section 540 judges whether or not the certain range is specified by the range specification box 902, in this case, sets a judgment result to "No" and repeats the same judgment. In this case, when the operator specifies south portion in Hokkaido by the range specification box 902, the target setting section 540 sets a judgment result of the step SB6 to "Yes".

At step SB7, the target setting section 540 displays the mesh-like enlarged map 903 corresponding to the range specification box 902 on the map setting screen 900. At step SB8, the target setting section 540 judges whether or not a target area (a map mesh) in the enlarged map 903 is pointed, in this case, sets a judgment result to "No" and repeats the same judgment.

In this case, when the operator points a map mesh 903A of the enlarged map 903 as a target area (for example, Atsubetsu-ku, Sapporo-city), the target setting section 540 sets the judgment result at step SB8 to "Yes". At step SB9, the target setting section 540 calculates a position coordinate (x coordinate and y coordinate) of the pointed map mesh 903A (Atsubetsu-ku, Sapporo-city). As the position coordinate, for example, a center coordinate of the map mesh 903A is employed.

At step SB12, the target setting section 540 calculates the coordinate (coordinate range) of the acquirement range (for example, 4 km four ways) input to the acquirement range inputting space 809 shown in FIG. 20 around the positional coordinate calculated at step SB9. In the example shown in FIG. 21, the acquirement range corresponds to an acquirement range 903B. Accordingly, a coordinate range calculated at step SB12 corresponds to a bottom left x coordinate, a bottom left y coordinate, an upper right x coordinate and an upper right y coordinate in the acquirement the mesh-like enlarged map 903 corresponding to the range specification box 902 on the map setting screen 900. At step SB8, the target setting section 540 judges whether or not a target area (a map mesh) in the enlarged map 903 is pointed, in this case, sets a judgment result to "No" and repeats the same judgment.

In this case, when the operator points a map mesh 903A of the enlarged map 903 as a target area (for example, Atsubetsu-ku, Sapporo-city), the target setting section 540 sets the judgment result at step SB8 to "Yes". At step SB9, the target setting section 540 calculates a position coordinate (x coordinate and y coordinate) of the pointed map mesh 903A (Atsubetsu-ku, Sapporo-city). As the position coordinate, for example, a center coordinate of the map mesh 903A is employed.

At step SB12, the target setting section 540 calculates the coordinate (coordinate range) of the acquirement range (for example, 4 km four ways) input to the acquirement range inputting space 809 shown in FIG. 20 around the positional coordinate calculated at step SB9. In the example shown in FIG. 21, the acquirement range corresponds to an acquirement range 903B. Accordingly, a coordinate range calculated at step SB12 corresponds to a bottom left x coordinate, a bottom left y coordinate, an upper right x coordinate and an upper right y coordinate in the acquirement range 903B.

At step SB13, the target setting section 540 acquires a map mesh ID of each of map meshes constituting the acquirement range 903B from the map information data base 650 shown in FIG. 7 on the basis of the positional coordinate of each of the map meshes in the acquirement range 903B constituting a key.

At step SB14, the target setting section 540 stores the map mesh ID acquired at step SB13 in the distribution information aggregating table 670 shown in FIG. 9. That is, the map mesh ID stored in the distribution information aggregating table 670 corresponds to an identification data for identifying each of the map meshes constituting the acquirement range 903B shown in FIG. 21.

At step SB15, the target setting section 540 lists up a base station ID corresponding to the wireless base station existing in the acquirement range 903B (refer to FIG. 21) from the base station positional information table 640 shown in FIG. 6 on the basis of the positional coordinate (FIG. 7, the bottom left x coordinate, the bottom left y coordinate, the upper right x coordinate and the upper right y coordinate) corresponding to the map mesh ID stored in the distribution information aggregating table 670 (refer to FIG. 9) constituting a key. At step SB16, the target setting section 540 outputs the base station ID acquired at step SB15 to the portable terminal positional information acquiring section 550.

When the base station ID is input to the portable terminal positional information acquiring section 550, at step SA6 shown in FIG. 11, the portable terminal positional information acquiring section 550 executes a portable terminal positional information acquiring process for acquiring a positional information of the portable terminal existing in the acquirement range 903B (refer to FIG. 21) from the positional information data base 320.

Figure 13:
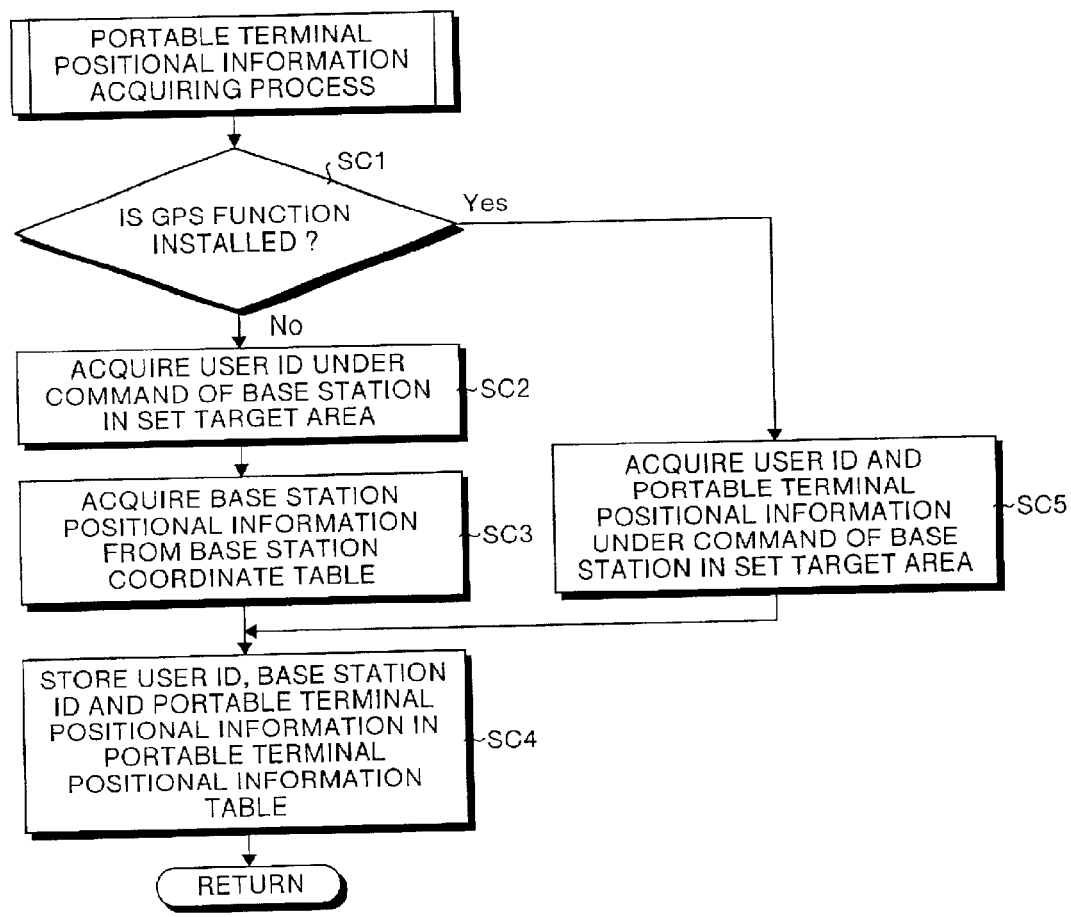
FIG. 13 is a flow chart describing a portable terminal positional information acquiring process shown in FIG. 11.
Figure 14:
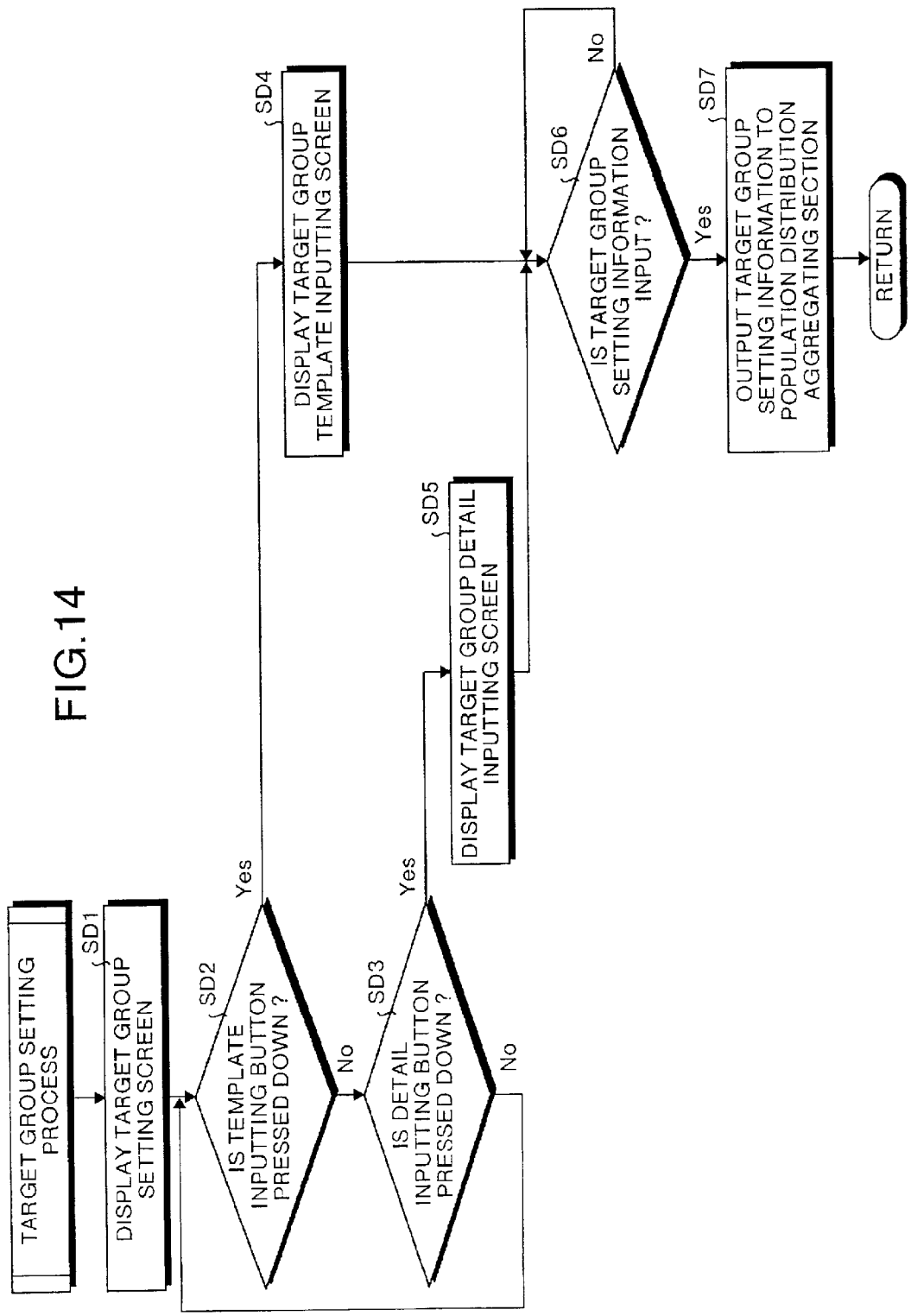
FIG. 14 is a flow chart describing a target group setting process shown in FIG. 11.
Figure 15:
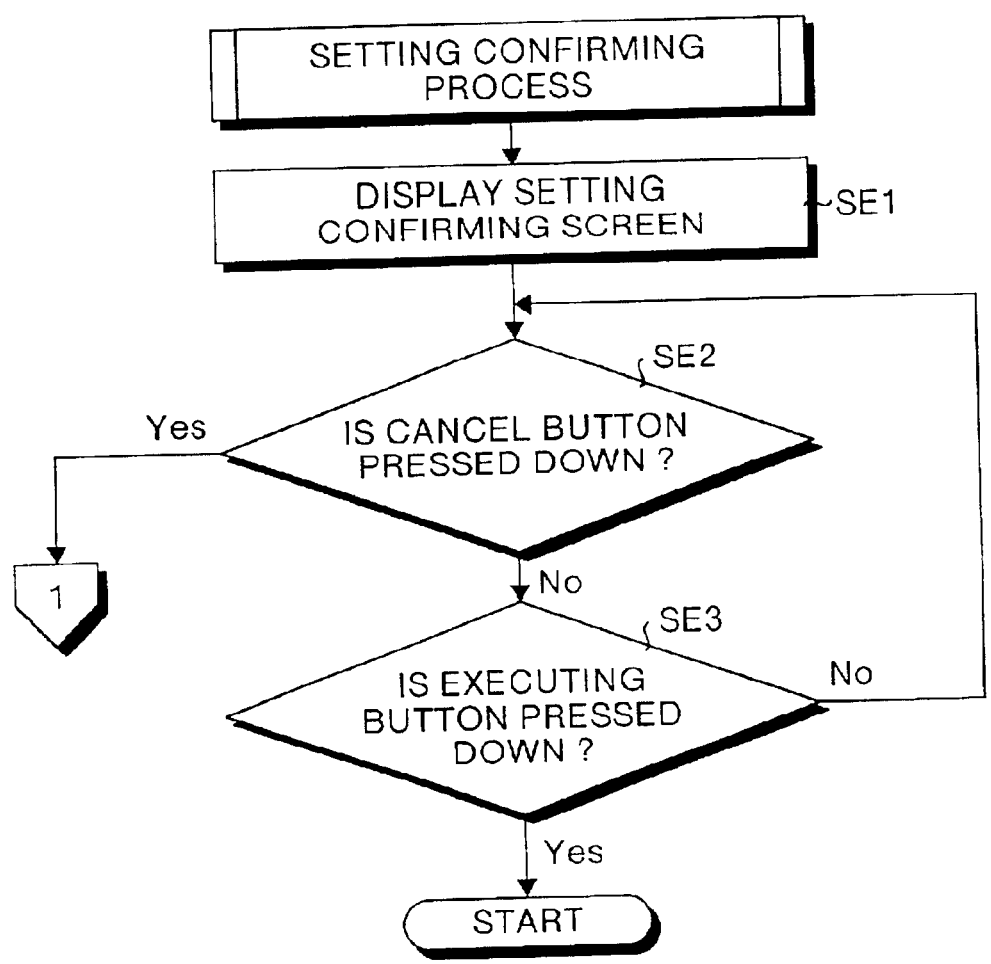
FIG. 15 is a flow chart describing a settings confirming process shown in FIG. 11.

That is, at step SC1 shown in FIG. 13, the portable terminal positional information acquiring section 550 judges on the basis of the kind of the terminal (refer to FIG. 2) whether or not a global positioning system (GPS) function is installed in the portable terminals $110_1$ to $110_n$. This GPS function corresponds to a function of positioning an accurate position (three-dimensional coordinate) of each of the portable terminals 1101 to 110n on the basis of a signal from a well-known GPS satellite.

Further, in the case that the GPS function is installed in the portable terminals 1101 to 110n, a positional information of the portable terminal itself is stored as a portable terminal positional information in the positional information data base 320.

Here, in the case that the GPS function is not installed in the portable terminals $110_1$ to $110_n$, an accurate positional information of the portable terminal itself is not known, so that the positional information of the wireless base station is stored as the portable terminal positional information relating to the portable terminal existing in the zone of the wireless base station, in the positional information data base 320.

In this case, if a judgment result at step SC1 is "No", at step SC2, the portable terminal positional information acquirement section 550 acquires a user ID corresponding to the portable terminal under command of the base station in the set target area (in this case, the acquirement range 903B (refer to FIG. 21) by the positional information data base 320 on the basis of the base station ID input from the target setting section 540 constituting a key.

That is, at step SC2, the portable terminal positional information acquirement section 550 acquires the user ID corresponding to the portable terminal existing in the target area set in accordance with any one target area setting method among the map setting method, the address setting method, the landmark setting method and the latitude and longitude setting method mentioned above.

At step SC3, the portable terminal positional information acquirement section 550 acquires a base station positional information (x coordinate, y coordinate and z coordinate) from the base station positional information table 640 (refer to FIG. 6) on the basis of the base station ID input from the target setting section 540 constituting a key. In this case, the base station positional information is set to a portable terminal positional information.

At step SC4, the portable terminal positional information acquirement section 550 stores the user ID acquired at step SC2, the base station ID input by the target setting section 540 and the portable terminal positional information (the base station positional information) acquired at step SC3 in the portable terminal positional information table 620 (refer to FIG. 4).

On the contrary, in the case that the GPS function is installed in the portable terminals 110₁ to 110ₙ, the portable terminal positional information acquirement section 550 set the judgment result at step SC1 to "Yes". At step SC5, the portable terminal positional information acquirement section 550 acquires the user ID and the accurate portable terminal positional information corresponding to the portable terminal under command of the base station in the set target area (in this case, the acquirement range 903B (refer to FIG. 21)) by the positional information data base 320 on the basis of the base station ID input from the target setting section 540 constituting a key.

At step SC4, the portable terminal positional information acquirement section 550 stores the user ID acquired at step SC5, the base station ID input by the target setting section 540 and the accurate portable terminal positional information acquired at step SC5 in the portable terminal positional information table 620 (refer to FIG. 4). Accordingly, the setting of the target area in accordance with the map setting method is finished.

Further, when the setting button 810 is pressed down after the address radio button 804 shown in FIG. 20 is checked, the prefectural and city governments is selected in the prefectural and city governments space 805, the detailed address is input to the detailed address input space 806, and the acquirement range is input to the acquirement range input space 809, the target setting section 540 set the judgment result at step SB3 to "Yes".

At step SB10, the target setting section 540 converts the input address to the positional coordinate (x coordinate, y coordinate and z coordinate) with reference to the address/landmark positional information database 660 shown in FIG. 8. At step SB12, the target setting section 540 calculates the coordinate (the coordinate range) of the acquirement range (for example, 4 km four ways) input to the acquirement range inputting space 809 shown in FIG. 20 around the positional coordinate converted at step SB10.

At step SB13, the target setting section 540 acquires the map mesh ID of each of the map meshes constituting the acquirement range from the map information data base 650 shown in FIG. 7 on the basis of the positional coordinate of each of the map meshes in the acquirement range constituting a key.

At step SB14, the target setting section 540 stores the map mesh ID acquired at step SB13 in the distribution information aggregating table 670 shown in FIG. 9. At step SB15, the target setting section 540 lists up the base station ID corresponding to the wireless base station existing in the acquirement range from the base station positional information table 640 shown in FIG. 6 in the same manner as that of the process mentioned above.

At step SB16, the target setting section 540 outputs the base station ID acquired at step SB15 to the portable terminal positional information acquiring section 550. Thereafter, the portable terminal positional information acquiring process shown in FIG. 13 is executed.

Further, when the setting button 810 is pressed down after the landmark setting button 807 shown in FIG. 20 is checked, the landmark information is input to the landmark information inputting space 808 and the acquirement range is input to the acquirement range input space 809, the target setting section 540 set the judgment result at step SB3 to "Yes".

At step SB10, the target setting section 540 converts the input landmark information to the positional coordinate (x coordinate, y coordinate and z coordinate) with reference to the address/landmark positional information data base 660 shown in FIG. 8. Thereafter, the steps SB12 to the steps SB16 and the portable terminal positional information acquiring process shown FIG. 13 are executed.

Further, when the setting button 810 is pressed down after the latitude and longitude radio button 802 shown in FIG. 20 is checked, the latitude and longitude are input to the latitude and longitude inputting space 803 and the acquirement range is input to the acquirement range input space 809, the target setting section 540 set the judgment result at step SB4 shown in FIG. 12 to "Yes". At step SB11, the target setting section 540 converts the input latitude and longitude to the positional coordinate (x coordinate, y coordinate and z coordinate) with reference to the converting table (not shown).

At step SB12, the target setting section 540 calculates the coordinate (the coordinate range) of the acquirement range (for example, 4 km four ways) input to the acquirement range inputting space 809 shown in FIG. 20 around the positional coordinate converted at step SB11.

At step SB13, the target setting section 540 acquires the map mesh ID of each of the map meshes constituting the acquirement range from the map information data base 650 shown in FIG. 7 on the basis of the positional coordinate of each of the map meshes in the acquirement range constituting a key. Thereafter, the step SB14 to the step SB16 mentioned above and the portable terminal positional information acquiring process shown in FIG. 13 are executed.

Next, at step SA7 shown in FIG. 11, the portable terminal positional information acquirement section 550 displays the default screen 700 shown in FIG. 19 on the display section 580. The operator presses down the target group setting button 702 by using the inputting section 590 so as to set the target group. Accordingly, the target setting section 540 sets the judgment result at step SA3 shown in FIG. 11 to "Yes".

At step SA8, the target setting section 540 executes a target group setting process. That is, at step SD1 shown in FIG. 14, the target setting section 540 displays a target group setting screen 1000 shown in FIG. 22 on the display section 580.

The target group setting screen 1000 corresponds to a screen for selecting by which of the template input (refer to FIG. 23) and the detail input (refer to FIG. 24) the target group constituting a search key in the population distribution analysis is set. In the target group setting screen 1000, a template inputting button 1001 corresponds to a button for selecting the template input. A detail inputting button 1002 corresponds to a button for selecting the detail input. A returning button 1003 corresponds to a button for transiting the screen to the preceding screen.

Returning to FIG. 14, at step SD2, the target setting section 540 judges whether or not the template inputting button 1001 is pressed down, and in this case, set the judgment result to "No". At step SD3, the target setting section 540 judges whether or not the detail inputting button 1002 is pressed down, and in this case, set the judgment result to "No". Thereafter, the target setting section 540 repeats the judgments at step SD2 and the step SD3 until the judgment result at step SD2 or the step SD3 becomes "Yes".

Here, in the case of setting the target group on the basis of the template input, the operator presses down the template inputting button 1001 by using the inputting section 590. Accordingly, the target setting section 540 sets the judgment result at step SD2 to "Yes". At step SD4, the target setting section 540 displays a target group template inputting screen 1100 shown in FIG. 23 on the display section 580.

The target group template inputting screen 1100 corresponds to a screen for inputting the target group on the basis of a preset template such as an age group and a category. In this target group template inputting screen 1100, an age group selecting box 1101 corresponds to a selecting box group for selecting a desired age group (single or plural) among five age groups comprising child, young people, middle age, late middle age and old age groups.

A category selecting space 1102 is provided for selecting a category of a subject to be promoted (white consumer electronics, audio and visual equipment and the like), for example, in the case of performing a promotion and advertising, with respect to the target group (the user of the portable terminal). A returning button 1103 corresponds to a button for transiting the screen to the preceding screen.

Returning to FIG. 14, at step SD6, the target setting section 540 judges on the basis of the target group template inputting screen 1100 (refer to FIG. 23) whether or not the target group setting information (age group and category) is set, in this case, sets the judgment result to "No" and repeat the same judgment.

Further, when the operator inputs the target group setting information by using the target group template inputting screen 1100, the target setting section 540 sets a judgment result at step SD6 to "Yes". At step SD7, the target setting section 540 outputs the target group setting information to the population distribution aggregating section 560.

On the contrary, in the case of setting the target group on the basis of the detail inputting, the operator presses down the detail inputting button 1002 (refer to FIG. 22) by using the inputting section 590. Accordingly, the target setting section 540 sets the judgment result at step SD3 shown in FIG. 14 "Yes". At step SD5, the target setting section 540 displays a target group detail inputting screen 1200 shown in FIG. 24 on the display section 580.

The target group detail inputting screen 1200 corresponds to a screen for inputting a detail information for specifying the target group such as age, sex, marriage, address, avocation, state of life, field of interest and the like. In this target group detail inputting screen 1200, a detail information inputting space 1201 corresponds to a space for inputting the detail information mentioned above. A returning button 1202 corresponds to a button for transiting the screen to the preceding screen.

Returning to FIG. 14, at step SD6, the target setting section 540 judges on the basis of the target group detail inputting screen 1200 (refer to FIG. 24) whether or not the target group setting information (age, sex, marriage, address or the like) is set, in this case, sets the judgment result to "No" and repeats the same judgment.

Further, when the operator inputs the target group setting information by using the target group detail inputting screen 1200, the target setting section 540 sets the judgment result at step SD6 to "Yes". At step SD7, the target setting section 540 outputs the target group setting information to the population distribution aggregating section 560.

Next, at step SA9 shown in FIG. 11, the target setting section 540 displays the default screen 700 shown in FIG. 19 on the display section 580. The operator presses down the settings confirming button 703 shown in FIG. 19 by using the inputting section 590 so as to confirm the setting of the target area and the target group. Accordingly, the target setting section 540 sets the judgment result at step SA4 shown in FIG. 11 to "Yes".

At step SA10, the target setting section 540 executes a settings confirming process. That is, at step SE1 shown in FIG. 15, the target setting section 540 displays a settings confirming screen 1300 shown in FIG. 25 on the display section 580. The settings confirming screen 1300 corresponds to a screen for confirming the setting of the target group (the detail setting and the template setting) and the setting of the target area, and executing the population distribution analysis on the basis of the settings.

In the settings confirming screen 1300, a setting information 1301 corresponds to a target group (detail setting and template setting) set on the basis of the target group setting process (refer to FIG. 14) and a target area set on the basis of the target area setting process (refer to FIG. 12).

An executing button 1302 corresponds to a button for executing the population distribution analysis on the basis of the setting information 1301. A cancel button 1303 corresponds to a button for canceling the population distribution analysis. A returning button 1304 corresponds to a button for transiting the screen to the preceding screen.

At step SE2, the target setting section 540 judges whether or not the cancel button 1303 is pressed down, and in the case that the judgment result is "Yes", executes the process of the step SA1 shown in FIG. 11.

Here, in the case that the judgment result at step SE2 is "No", the target setting section 540 judges at step SE3 whether or not the executing button 1302 is pressed down, and in this case, sets the judgment result to "No". Thereafter, the target setting section 540 repeats the judgments at step SE2 and the step SE3 until the judgment results at step SE2 or the step SE3 becomes "Yes".

Further, the operator presses down the executing button 1302 by using the inputting section 590 when confirming that the setting information 1301 (refer to FIG. 25) is accurate. Accordingly, the target setting section 540 sets the judgment result at step SE3 to "Yes".

Next, at step SA11 shown in FIG. 11, the population distribution aggregating section 560 executes a population distribution aggregating process of aggregating the population distribution of the user bringing the portable terminal therewith in the acquirement range 903B (refer to FIG. 21) on the basis of the target area setting and the target group setting.

Figure 16:
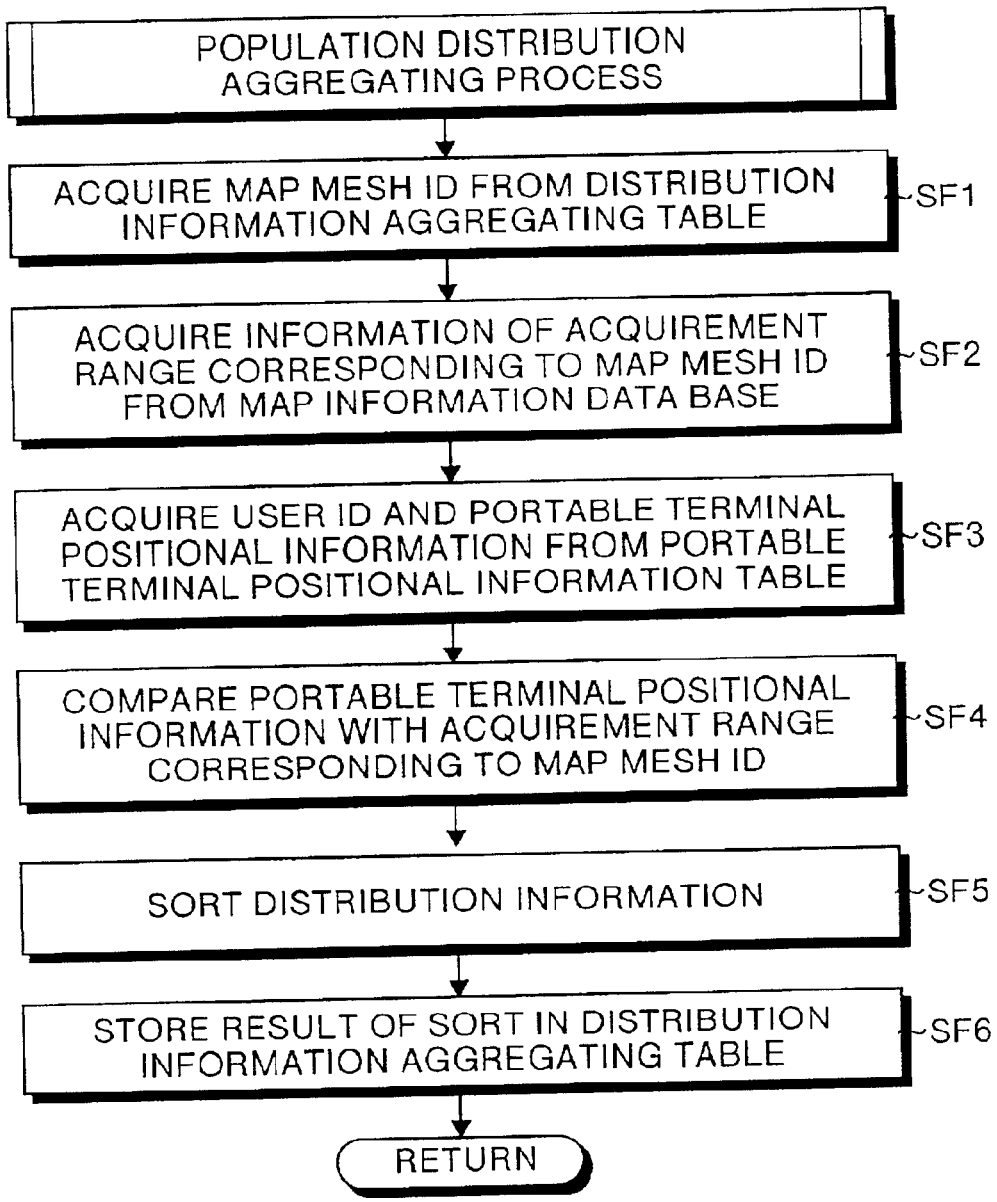
FIG. 16 is a flow chart describing a population distribution aggregating process shown in FIG. 11.
Figure 17:
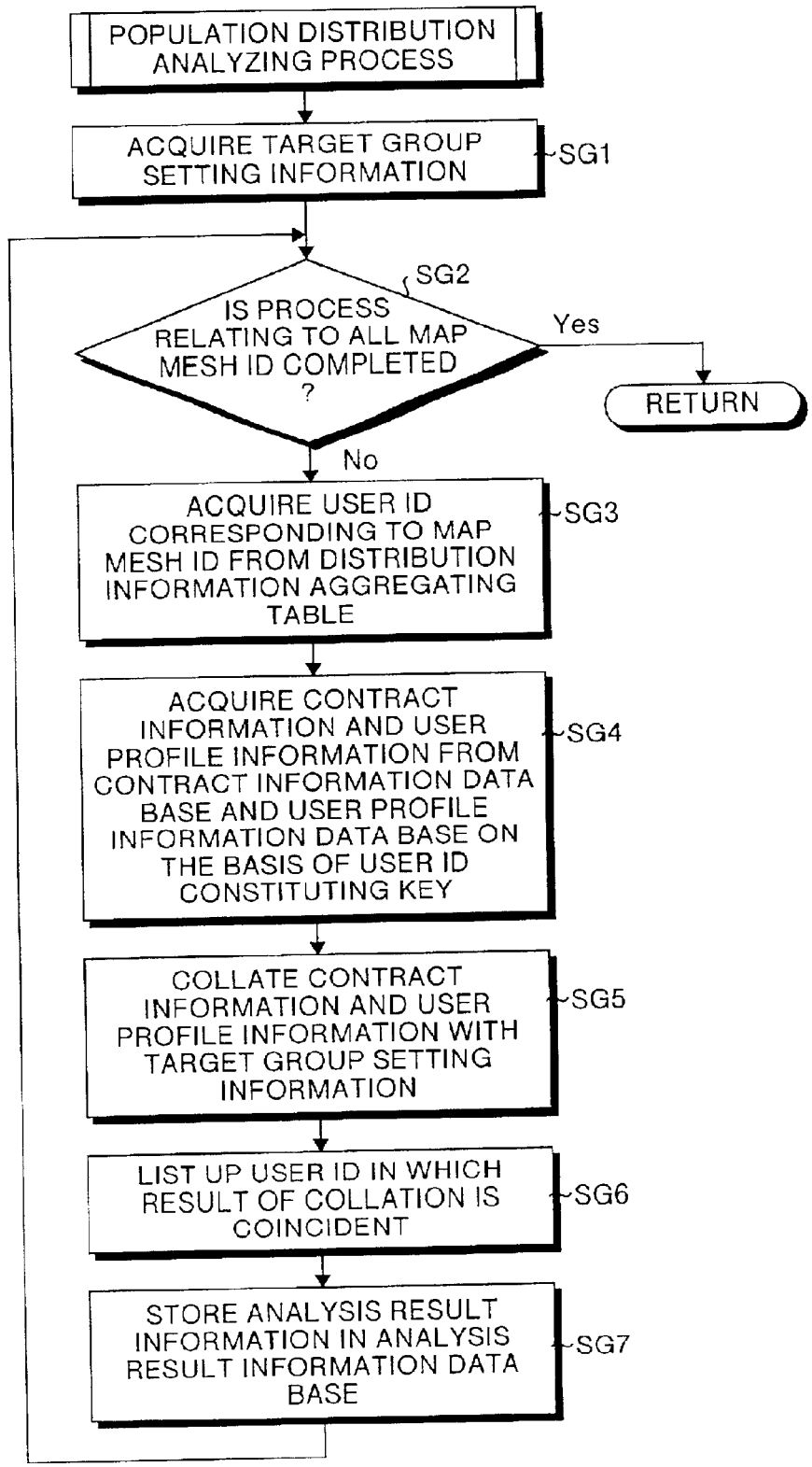
FIG. 17 is a flow chart describing a population distribution analyzing process shown in FIG. 11.

In particular, at step SF1 shown in FIG. 16, the population distribution aggregating section 560 acquires the map mesh ID from the distribution information aggregating table 670 (refer to FIG. 9) At step SF2, the population distribution aggregating section 560 acquires the information of the acquirement range (bottom left x coordinate, bottom left y coordinate, upper right x coordinate and upper right y coordinate) from the map information data base 650 shown in FIG. 7 on the basis of the map mesh ID acquired at step SF1 constituting a key. In this case, the acquirement range is the acquirement range 903B shown in FIG. 21.

At step SF3, the population distribution aggregating section 560 acquires the user ID and the portable terminal positional information from the portable terminal position information table 620 shown in FIG. 4. At step SF4, the population distribution aggregating section 560 compares the portable terminal positional information acquired at step SF3 with the acquirement range acquired at step SF2 so as to pick up the portable terminal positional information corresponding to the portable terminal (the user) distributed within the acquirement range in correspondence to the map mesh ID and the user ID. In the following description, the map mesh ID, the user ID and the portable terminal positional information are called as a distribution information.

At step SF5, the population distribution aggregating section 560 aggregates the number of the user ID (the number of the users) at every map mesh ID picked up at step SF4 and sorts the distribution information on the basis of the number of the users constituting a key.

At step SF6, the population distribution aggregating section 560 stores the sort result at step SF5 in the distribution information aggregating table 670. In an example shown in the drawing, three users are distributed in the map mesh corresponding to the map mesh ID=000001. Further, ten users are distributed in the map mesh corresponding to the map ID=000002.

Next, at step SA12 shown in FIG. 11, the population distribution analyzing section 570 executes a population distribution analyzing process on the basis of the population distribution aggregation result at step SA11. In particular, at step SG1 shown in FIG. 17, the population distribution analyzing section 570 acquires the target group setting information output from the target setting section 540 in the target group setting process (refer to FIG. 14).

At step SG2, the population distribution analyzing section 570 judges whether or not the population distribution analyzing process is finished in all of the map mesh ID stored in the distribution information aggregating table 670 (refer to FIG. 9), and in this case, set a judgment result to "No". At step SG3, the population distribution analyzing section 570 acquires the user ID corresponding to the map mesh ID (=000001) from the distribution information aggregating table 670 shown in FIG. 9.

At step SG4, the population distribution analyzing section 570 acquires the contract information and the user profile information from the contract information data base 600 (refer to FIG. 2) and the user profile information data base 610 (refer to FIG. 3) on the basis of the user ID acquired at step SG3 constituting a key.

At step SG5, the population distribution analyzing section 570 collates the contract information and the user profile information with the target group setting information acquired at step SG1. For example, in the case that the target group setting information is within the range of age (between 13 years old and 22 years old) shown in FIG. 24, the user ID within the range of age mentioned above corresponding to a collation results is obtained on the basis of the "date of birth" constituting the contract information shown in FIG. 2.

At step SG6, the population distribution analyzing section 570 lists up the user ID in which the coincident collation result is obtained at step SG5. That is, the listed up user ID corresponds to the user (the portable terminal) distributing on certain one map mesh constituting the acquirement range 903B. In this case, with respect to the map mesh ID (=000001) shown in FIG. 9, it is assumed that the user IS (=09022223333, 09033334444) is listed up.

At step SG7, the population distribution analyzing section 570 stores the user ID (=09022223333, 09033334444) listed up at step SG6 with respect to the map mesh ID (=000001), the map mesh ID mentioned above, the number of the users (the number of the user ID) and the portable terminal positional information (x coordinate, y coordinate and z coordinate) as the analysis result information, in the analysis result information table 680 shown in FIG. 10.

At step SG2, the population distribution analyzing section 570 judges whether or not the population distribution analyzing process is finished in all of the map mesh ID stored in the distribution information aggregating table 670 (refer to FIG. 9), and in this case, sets the judgment result to "No".

At step SG3, the population distribution analyzing section 570 acquires the user ID corresponding the next map mesh ID (=000002) from the distribution information aggregating table 670 shown in FIG. 9. Thereafter, the process following to the step SG3 is repeatedly executed until the judgment result at step SG2 becomes "Yes".

Further, when all the corresponding analysis result information is stored in the analysis result information table 680 (refer to FIG. 10), and the population distribution analyzing process with respect to all the map mesh ID is finished, the population distribution analyzing section 570 set the judgment result at step SG2 to "Yes". At step SA13 shown in FIG. 11, the population distribution analyzing section 570 executes population distribution displaying process for displaying the population distribution analysis result on the display section 580.

Figure 18:
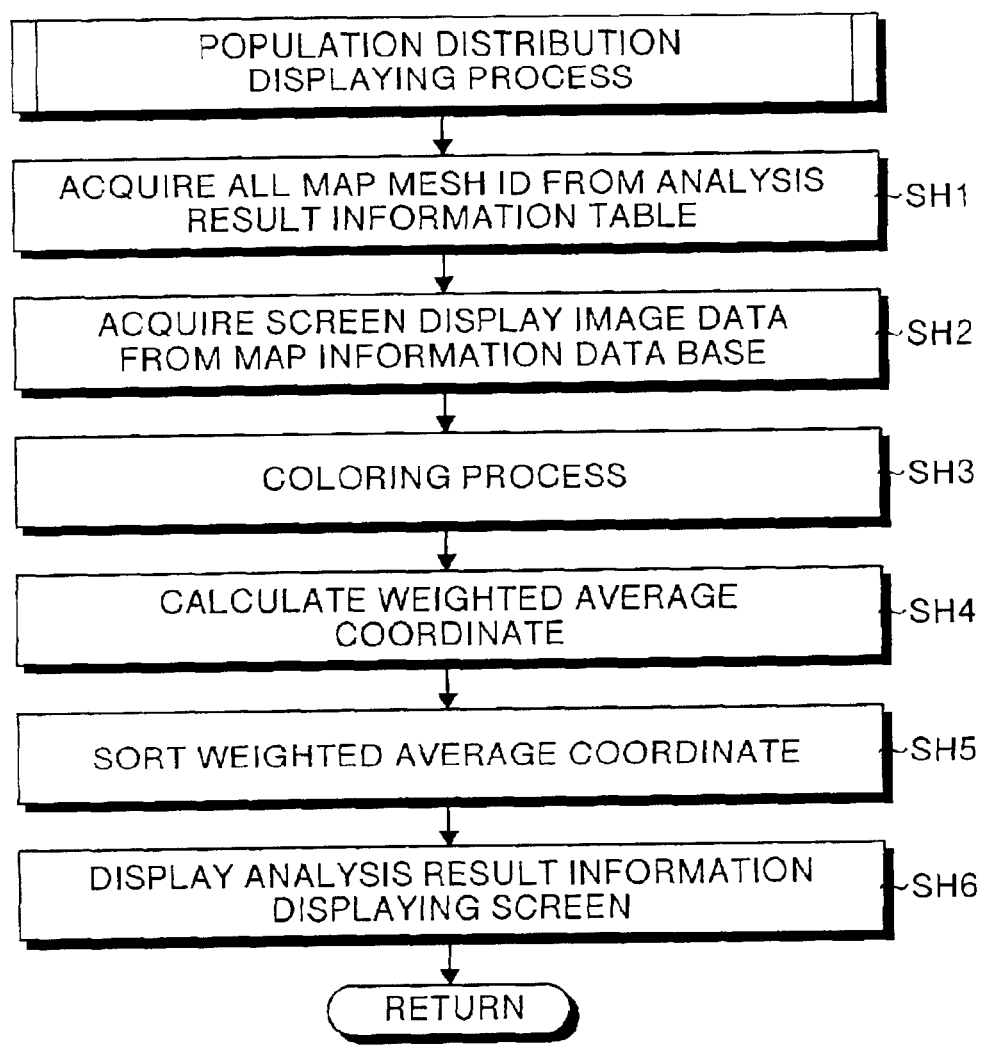
FIG. 18 is a flow chart describing a population distribution displaying process shown in FIG. 11.

In particular, at step SH1 shown in FIG. 18, the population distribution analyzing section 570 acquires all the map mesh ID from the analysis result information table 680 shown in FIG. 10. At step SH2, the population distribution analyzing section 570 acquires a screen display image data from the map information data base 650 (refer to FIG. 7) on the basis of the map mesh ID acquired at step SH1 constituting a key.

At step SH3, the population distribution analyzing section 570 executes a coloring process of sorting the "number of the users" in the analysis result information table 680 shown in FIG. 10 and coloring the screen display image data (refer to the step SH2) corresponding to the number of the users (the map mesh ID).

As a method of this coloring, for example, there is listed up a method of setting the number of the users to three stages and coloring the screen display image data of a stage having most users, the screen display image data having least users and the screen display image data having middle users to "red", "blue" and "yellow", respectively. Here, in the case that the number of the users is 0, the screen display image data is achromatized.

At step SH4, the population distribution analyzing section 570 takes a weighted average between the number of the users on the analysis result information table 680 and the portable terminal positional information (x coordinate, y coordinate and z coordinate) at every map mesh ID acquired at step SH1, and calculates it as a weighted average coordinate.

At step SH5, the population distribution analyzing section 570 sorts the weighted average coordinate calculated at step SH4 and the map mesh ID corresponding thereto on the basis of the number of the users in the analysis result information table 680 (refer to FIG. 10) constituting a key. At step SH6, the population distribution analyzing section 570 displays an analysis result information displaying screen 1400 shown in FIG. 26 on the display section 580.

Figure 21:
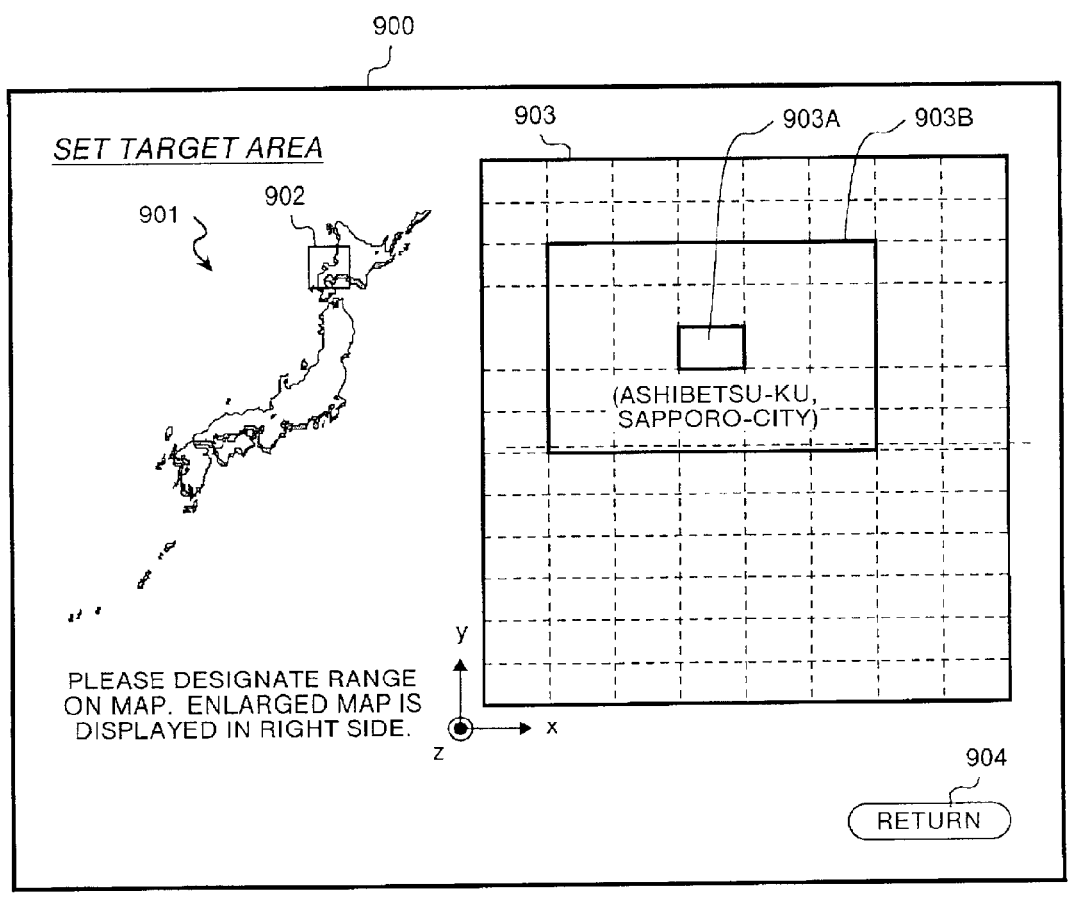
FIG. 21 is a view showing an example of a map setting screen 900 in accordance with the same embodiment.
Figure 22:
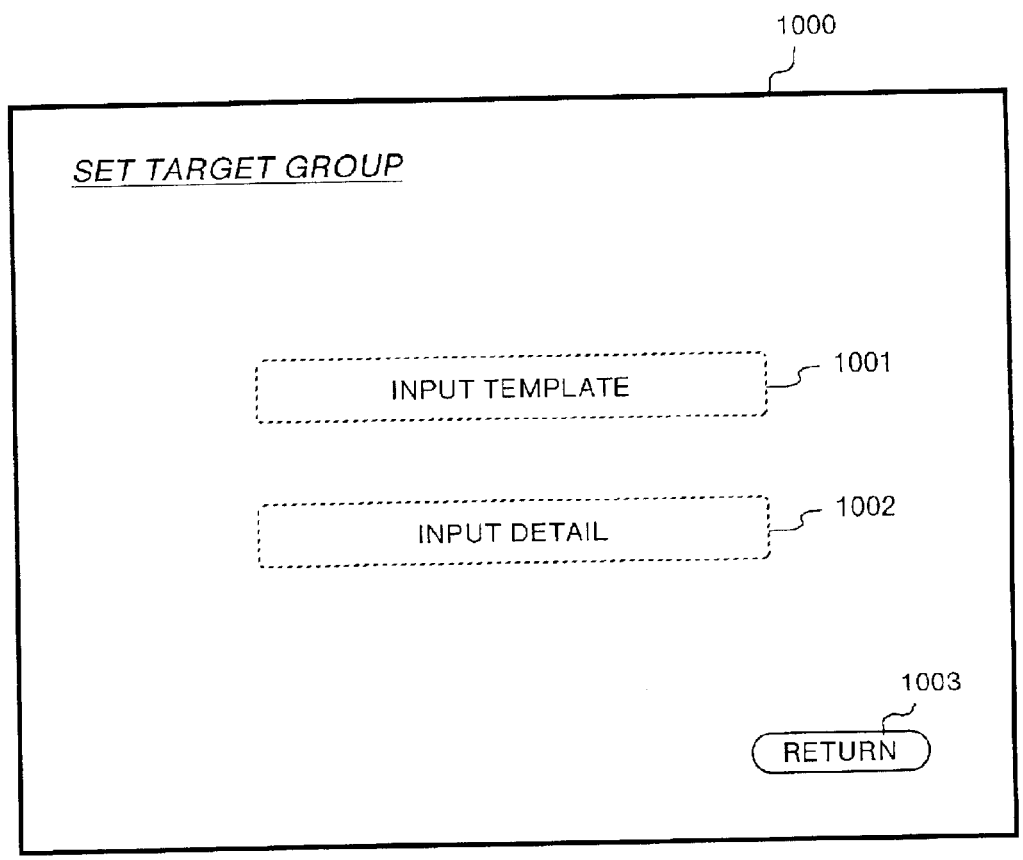
FIG. 22 is a view showing an example of a target group setting screen 1000 in accordance with the same embodiment.

The analysis result information displaying screen 1400 corresponds to a screen for displaying the analysis result information of the population distribution in the acquirement range 903B shown in FIG. 21. In this analysis result information displaying screen 1400, the acquirement range 1401 corresponds to the acquirement range 903B and is constituted by a plurality (5×5) of map meshes.

A map mesh 1401A corresponds to a XX ball park, and is colored by the red color showing that the number of the users of the portable terminal is most. Accordingly, in the acquirement range 1401, a population density of the XX ball park (the map mesh 1401A) is highest. In this map mesh 1401A, the information of the number of the users is displayed. Further, close to the map mesh 1401A, a mark "(1)" showing that the population density is high is displayed. In this case, in accordance with one embodiment, in addition to the landmark information of the XX ball park or the like, the address may be displayed.

Further, a map mesh 1401B corresponds to a XX park, and is colored by a yellow color showing that the number of the users of the portable terminal is large next to the map mesh 1401A. Accordingly, in the acquirement range 1401, the population density of the XX park (the map mesh 1401B) is high next to the XX ball park. In this map mesh 1401B, the information of the number of the users is displayed. Further, close to the map mesh 1401B, a mark "(2)" showing that the population density is high next to the map mesh 1401A is displayed.

Further, a map mesh 1401C corresponds to a XX amusement park, and is colored by a blue color showing that the number of the users of the portable terminal is large next to the map mesh 1401B. Accordingly, in the acquirement range 1401, the population density of the XX amusement park (the map mesh 1401C) is high next to the XX park. In this map mesh 1401C, the information of the number of the users is displayed. Further, close to the map mesh 1401C, a mark "(3)" showing that the population density is high next to the map mesh 1401B is displayed.

In the coordinate/user number display space 1402, the weighted average coordinate (X coordinate, Y coordinate and Z coordinate) and the number of the users respectively corresponding to the map mesh 1401A, the map mesh 1401B and the map mesh 1401C are displayed. These weighted average coordinate corresponds to a result sorted at step SH5 (refer to FIG. 18). Further, in the acquirement range 1401, an introducing path (an arrow in the drawing) from the high population density point to the low population density point ((1) to (2) to (3)) is displayed.

As mentioned above, in accordance with one embodiment, since the structure is made such as to set the target area of the subject to be analyzed of the population distribution and analyze the population distribution of the user in the target area on the basis of the portable terminal positional information after acquiring the portable terminal positional information of the portable terminal brought with the user in the target area, it is possible to accurately comprehend the population distribution in real time.

Moreover, since the structure is made such as to analyze the population distribution on the basis of the result obtained by abstracting the users corresponding to the set target group (for example, sex and age) from the users existing in the target area, it is possible to comprehend the target group in real time.

Figure 26:
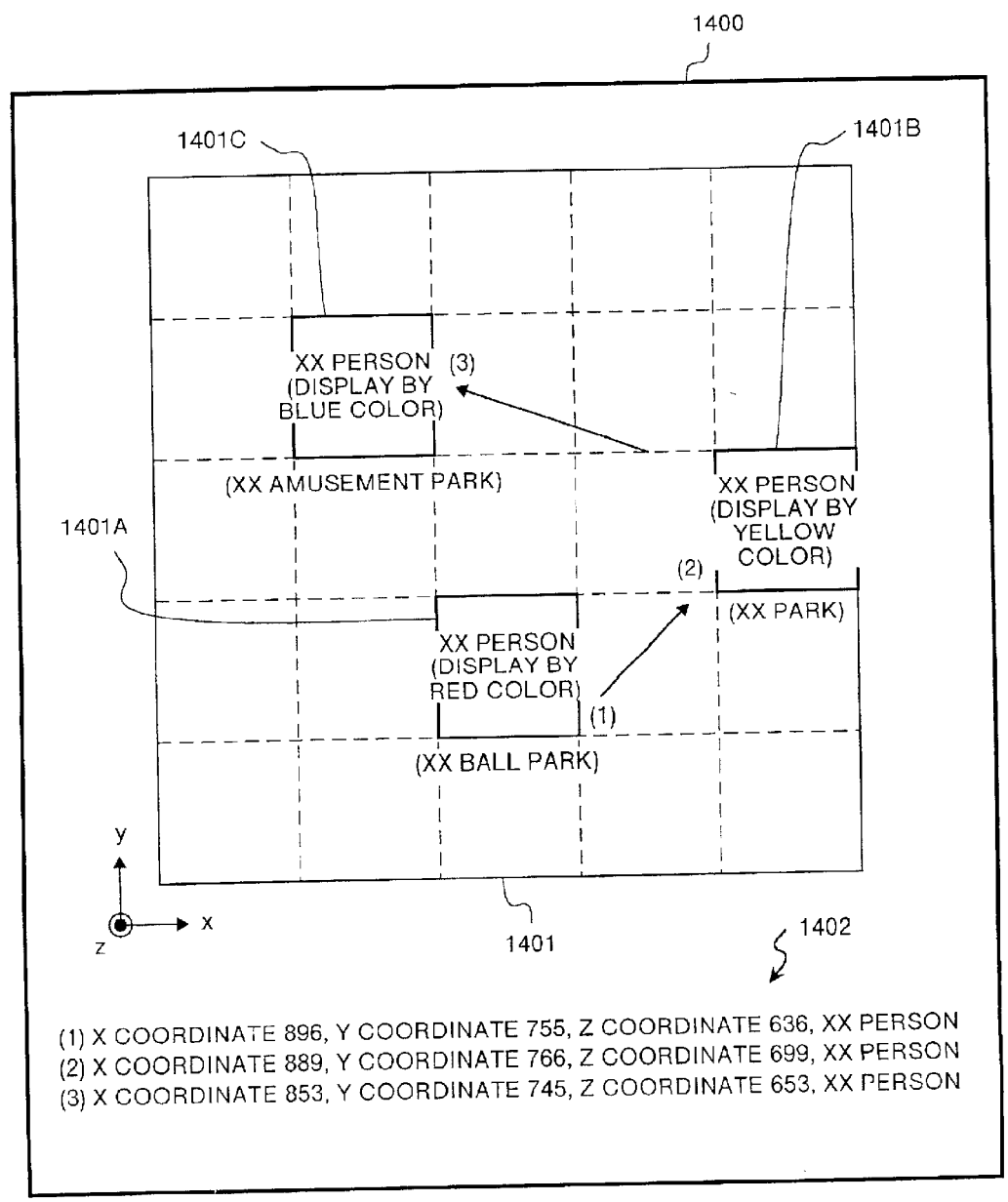
FIG. 26 is a view showing an example of an analysis result information displaying screen 1400 in accordance with the same embodiment.

Furthermore, as shown in FIG. 26, since the structure is made such as to display the population distribution and the order of the population density in the target area of the subject to be analyzed of the population distribution, it is possible to accurately comprehend the level of the population density, and it is possible to easily fix an order of priority of various kinds of motions (for example, the promotion and advertising campaign).

Moreover, as shown in FIG. 26, since the structure is made such as to display the point information (XX ball park, XX park and XX amusement park) in correspondence to the order of the population density, it is possible to rapidly execute various kinds of motions (for example, the promotion and advertising campaign) using the level of the population density and the point information so as to increase the promotion and advertising effect or the like.

Furthermore, as shown in FIG. 26, since the structure is made such as to display the introducing path ((1) to (2) to (3)) from the point having the high order of the population density to the point having the low order, it is possible to executed various kinds of motions (for example, the promotion and advertising campaign) first from the point having the high population density, along the introducing path, and it is possible to make various kinds of motions effective (shorten the moving time).

Moreover, as shown in FIG. 26, since the point information is set to the coordinate on the map, the address or the landmark name, it is possible to rapidly move to the target point on the basis of the information.

Furthermore, if the portable terminal is provided with the positioning function in accordance with the GPS, the population distribution is analyzed on the basis of the significantly highly accurate information corresponding to the positioning result of the GPS, so that it is possible to significantly increase the accuracy of the population distribution analysis.

As mentioned above, the description is in detail given of the embodiment in accordance with the present invention with reference to the accompanying drawings, however, the particular structural embodiment is not limited to this embodiment, and a design modification and the like within the scope of the present invention will be included in the present invention.

Figure 27:
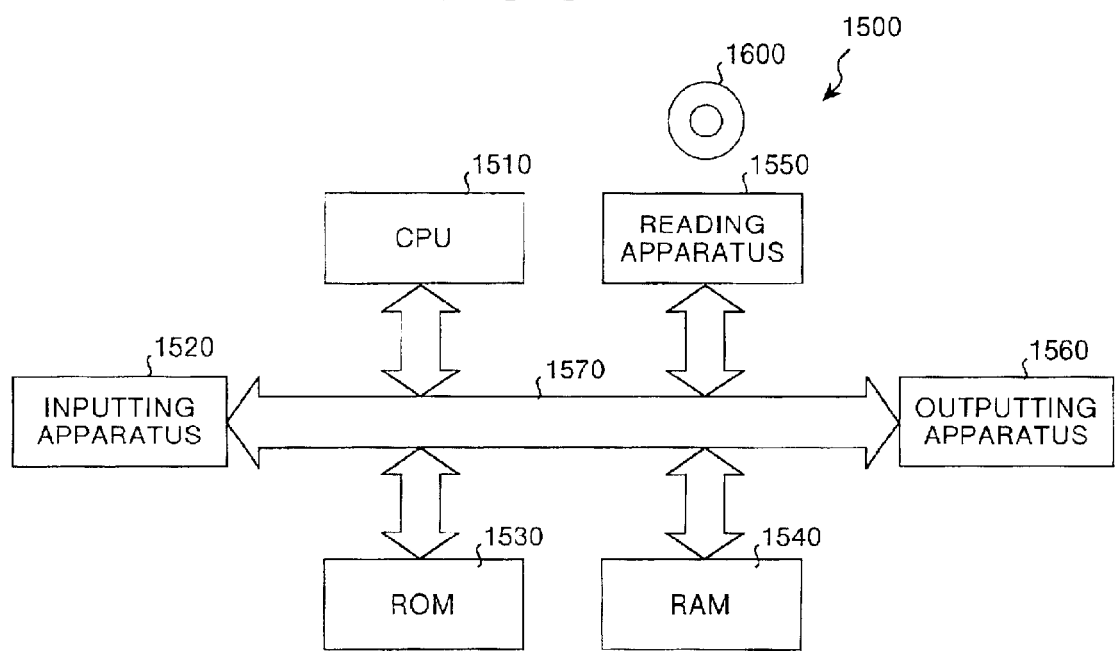
FIG. 27 is a block diagram showing a modified embodiment of the same embodiment.

For example, in the embodiment mentioned above, the structure may be made such as to record a population distribution analyzing program for realizing the function of the population distribution analyzing apparatus 500 shown in FIG. 1 in a recording medium 1600 capable of being read by a computer shown in FIG. 27, and read the population distribution analyzing program recorded in the recording medium 1600 by a computer 1500 shown in the drawing so as to execute, thereby realizing the function of the population distribution analyzing apparatus 500.

The computer 1500 shown in the drawing is constituted by a CPU 1510 executing the population distribution analyzing program, an inputting apparatus 1520 such as a keyboard, a mouse or the like, a read only memory (ROM) 1530 storing various kinds of data, a random access memory (RAM) 1540 storing an arithmetic parameter or the like, a reading apparatus 1550 reading the population distribution analyzing program from the recording medium 1600, an outputting apparatus 1560 such as a display, a printer or the like, and a bus 1570 connecting respective portions of the apparatus.

The CPU 1510 reads the population distribution analyzing program stored in the recording medium 1600 via the reading apparatus 1550 and thereafter executes the population distribution analyzing program, thereby executing the population distribution analysis mentioned above. In this case, the recording medium 1600 includes a luggable recording medium such as an optical disc, a floppy disc, a hard disc and the like, and further a transmission medium temporarily recording and holding data such as a network.

Further, in accordance with the above-explained embodiment, the structure may be made such as to interlock the population distribution analyzing apparatus 500 with a car navigation system. In this case, it is possible to rapidly introduce the vehicle to the target place corresponding to the population distribution.

Moreover, the description is given of the embodiment of analyzing the population distribution relating to the user bringing the portable terminal therewith, however, the structure is not limited to the distribution of the population, but can be applied to an analysis of a distribution relating to a subject such as an animal, a vehicle and the like. In this case, the population distribution analyzing apparatus 500 can acquire the positional information in real time by attaching an apparatus transmitting a positional information to the subject and utilizing a mobile communication system.

Furthermore, the structure may be made such as to mount the population distribution analyzing apparatus 500 shown in FIG. 1 on a moving body (a vehicle or the like) so as to apply a mobile communication function to the communication control section 510.

As mentioned above, in accordance with the present invention, since the structure is made such as to set the area of the subject of the population distribution analysis, acquire the positional information of the users of the portable terminals in the area, and thereafter analyze the population distribution of the users in the area on the basis of the positional information, there can be obtained an effect that it is possible to accurately comprehend the population distribution in real time.

Furthermore, since the structure is made such as to analyze the population distribution on the basis of the result obtained by abstracting the users corresponding to the set user attribute from the users existing in the area, there can be obtained an effect that it is possible to also comprehend the user attribute (for example, sex and age) in real time.

Moreover, since the structure is made such as to display the population distribution in the area of the subject of the population distribution analysis and the order of the population density, there can be obtained an effect that it is possible to accurately comprehend the level of the population density and it is possible to easily fix an order of priority of various kinds of motions.

Furthermore, since the structure is made such as to display the point information in correspondence to the order of the population density, there can be obtained an effect that it is possible to rapidly execute various kinds of motions using the level of the population density and the point information.

Moreover, since the structure is made such as to display the introducing path from the point in which the population density is high to the point in which the population density is low, there can be obtained an effect that it is possible to execute various kinds of motions first from the point in which the population density is high along the introducing path and it is possible to make various kinds of motion effective.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A population distribution analyzing apparatus in communication with a portable terminal communication system, the apparatus comprising:

an area setting unit which sets an area in the portable terminal communication system according to a user input at the apparatus, in the set area population distribution of a plurality of users respectively carrying a portable terminal therewith is analyzed;

a positional information acquiring unit which acquires respective positional information of each portable terminal in the set area;

an analyzing unit which analyzes the population distribution of the users in the set area based upon the acquired positional information; and a displaying unit which displays in a map image of the set area the population distribution and an order of a population density based upon an analysis result of the analyzing unit.

2. The population distribution analyzing apparatus according to claim 1, further comprising a user attribute setting unit which sets a user attribute, wherein the analyzing unit analyzes the population distribution based upon abstracting a user corresponding to the user attribute from the users existing in the set area.

3. The population distribution analyzing apparatus according to claim 1, wherein the displaying unit displays a point information in correspondence to the order of the population density.

4. The population distribution analyzing apparatus according to claim 1, wherein the displaying unit displays in the man image an introducing path from a point at which the population density is high to a point at which the population density is low.

5. The population distribution analyzing apparatus according to claim 3, wherein the point information corresponds to a coordinate on a map, an address or a landmark name.

6. The population distribution analyzing apparatus according to claim 1, wherein the displaying unit interlocks with a car navigation system.

7. The population distribution analyzing apparatus according to claim 1, wherein the portable terminal is provided with a positioning function in accordance with a global positioning system, and the positional information corresponds to a result of positioning of the global positioning system.

8. A population distribution analyzing apparatus in communication with a mobile communication system, the apparatus comprising:

an area setting unit which sets an area in the mobile communication system according to a user input at the apparatus, in the set area population distribution of a plurality of subjects carrying a mobile terminal is analyzed;

a positional information acquiring unit which acquires positional information of each subject in the set area according to the mobile communication system;

a subject attribute setting unit which sets an attribute of the subject according to a user input at the apparatus; and an analyzing unit which analyzes the distribution of the subjects in the set area based upon the acquired positional information and a result obtained by abstracting a subject corresponding to the set subject attribute from the subjects existing in the set area.

9. The population distribution analyzing apparatus according to claim 8, further comprising a displaying unit which displays the subject distribution in the set area and an order of a distribution density on the basis of a analysis result of the analyzing unit.

10. A population distribution analyzing method, comprising:

according to a user input, setting an area in a mobile communication system;

acquiring positional information of a plurality of users in the set area, each user carrying a portable terminal in the set area;

analyzing population distribution of the users in the set area based upon the acquired positional information; and displaying in a map image of the set area the population distribution and an order of the population density based upon the analyzing.

11. A population distribution analyzing method, comprising:

according to a user input, setting an area in a mobile communication system;

acquiring positional information of a plurality of subjects in the set area according to the mobile communication system, each subject carrying a mobile terminal in the set area;

according to a user input, setting an attribute of the subjects in the set area; and analyzing population distribution of the subjects in the set area based upon the acquired positional information and abstracting a subject corresponding to the set subject attribute from the subjects existing in the set area.

12. A computer program controlling a computer in communication with a portable terminal communication system, according to a process; comprising:

according to a user input, setting an area in the portable terminal communication system;

acquiring positional information of a plurality of users in the set area, each user carrying a portable terminal in the set area;

analyzing the population distribution of the users in the set area based upon the acquired positional information; and displaying in a map image of the set area the population distribution and an order of the population density based upon the analyzing.

13. A computer program controlling a computer in communication with a mobile communication system, according to a process comprising:

according to a user input, setting an area in the mobile communication system;

acquiring positional information of a plurality of subjects in the set area according to the mobile communication system, each subject carrying a mobile terminal in the set area;

according to a user input, setting an attribute of the subjects in the set area; and analyzing the population distribution of the subjects in the set area based upon the acquired positional information and abstracting a subject corresponding to the set subject attribute from the subjects existing in the set area.

* * * * *

UNITED STATES PATENT AND TRADEMARK OFFICE
CERTIFICATE OF CORRECTION

PATENT NO.   : 6,834,252 B2
DATED        : December 21, 2004
INVENTOR(S)  : Yoichi Yokota It is certified that error appears in the above-identified patent and that said Letters Patent is hereby corrected as shown below:

Column 22,
Line 18, before "image" change "man" to -- map --.

Column 23,
Line 21, after "process", delete ";".

Signed and Sealed this

Twenty-fourth Day of May, 2005

JON W. DUDAS
*Director of the United States Patent and Trademark Office*